United States Patent
Satoh et al.

(10) Patent No.: US 8,905,512 B2
(45) Date of Patent: Dec. 9, 2014

(54) IMAGE FORMING APPARATUS, IMAGE FORMING METHOD, AND RECORDING MEDIUM STORING A PROGRAM

(71) Applicants: Taku Satoh, Kanagawa (JP); Yasunobu Takagi, Kanagawa (JP); Toshihito Kamei, Tokyo (JP); Takashi Kimura, Kanagawa (JP)

(72) Inventors: Taku Satoh, Kanagawa (JP); Yasunobu Takagi, Kanagawa (JP); Toshihito Kamei, Tokyo (JP); Takashi Kimura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/960,975

(22) Filed: Aug. 7, 2013

(65) Prior Publication Data

US 2014/0043391 A1 Feb. 13, 2014

(30) Foreign Application Priority Data

Aug. 8, 2012 (JP) ................................. 2012-176205

(51) Int. Cl.
*B41J 2/12* (2006.01)
*H04N 1/60* (2006.01)
*B41J 2/21* (2006.01)

(52) U.S. Cl.
CPC ................ *B41J 2/12* (2013.01); *H04N 1/6033* (2013.01); *B41J 2/2146* (2013.01); *B41J 2/2128* (2013.01)
USPC .............................................. 347/19; 347/15

(58) Field of Classification Search
CPC ........ B41J 29/393; B41J 2/12; B41J 2/04508; B41J 2029/3935; B41J 2/2054; B41J 2/1404; H04N 1/6033
USPC ................ 347/14, 15, 16, 19, 43, 74, 78, 145
See application file for complete search history.

(56) References Cited

U.S. PATENT DOCUMENTS

| 7,717,534 | B2 * | 5/2010 | Inaba et al. ..................... 347/19 |
| 2008/0117467 | A1 | 5/2008 | Hosaka et al. |
| 2008/0137147 | A1 | 6/2008 | Nakano et al. |
| 2009/0179934 | A1 * | 7/2009 | Takagi et al. ................... 347/15 |
| 2009/0195585 | A1 | 8/2009 | Satoh et al. |
| 2010/0182366 | A1 | 7/2010 | Takagi et al. |
| 2010/0182367 | A1 | 7/2010 | Takagi et al. |
| 2010/0207982 | A1 | 8/2010 | Satoh et al. |
| 2011/0141528 | A1 | 6/2011 | Hirano et al. |
| 2011/0273746 | A1 | 11/2011 | Hoshino et al. |
| 2012/0223989 | A1 | 9/2012 | Takagi et al. |

FOREIGN PATENT DOCUMENTS

| JP | 4-028552 | 1/1992 |
| JP | 4-133741 | 5/1992 |
| JP | 2005-280068 | 10/2005 |
| JP | 2012-187859 | 10/2012 |

* cited by examiner

*Primary Examiner* — Thinh Nguyen
(74) *Attorney, Agent, or Firm* — Harness, Dickey & Pierce, P.L.C.

(57) ABSTRACT

An image forming apparatus that performs correction to make gradation values adding both of two head areas (A+C, B+D) approximately equal. An area whose density is the lowest is set as a target density. Assuming densities for head areas A=70, B=100, C=40, D=90, head areas B and D are corrected with correction amount that ΔB become equal to ΔD (ΔB=ΔD=40) in accordance with target value (A+C=100).

7 Claims, 21 Drawing Sheets

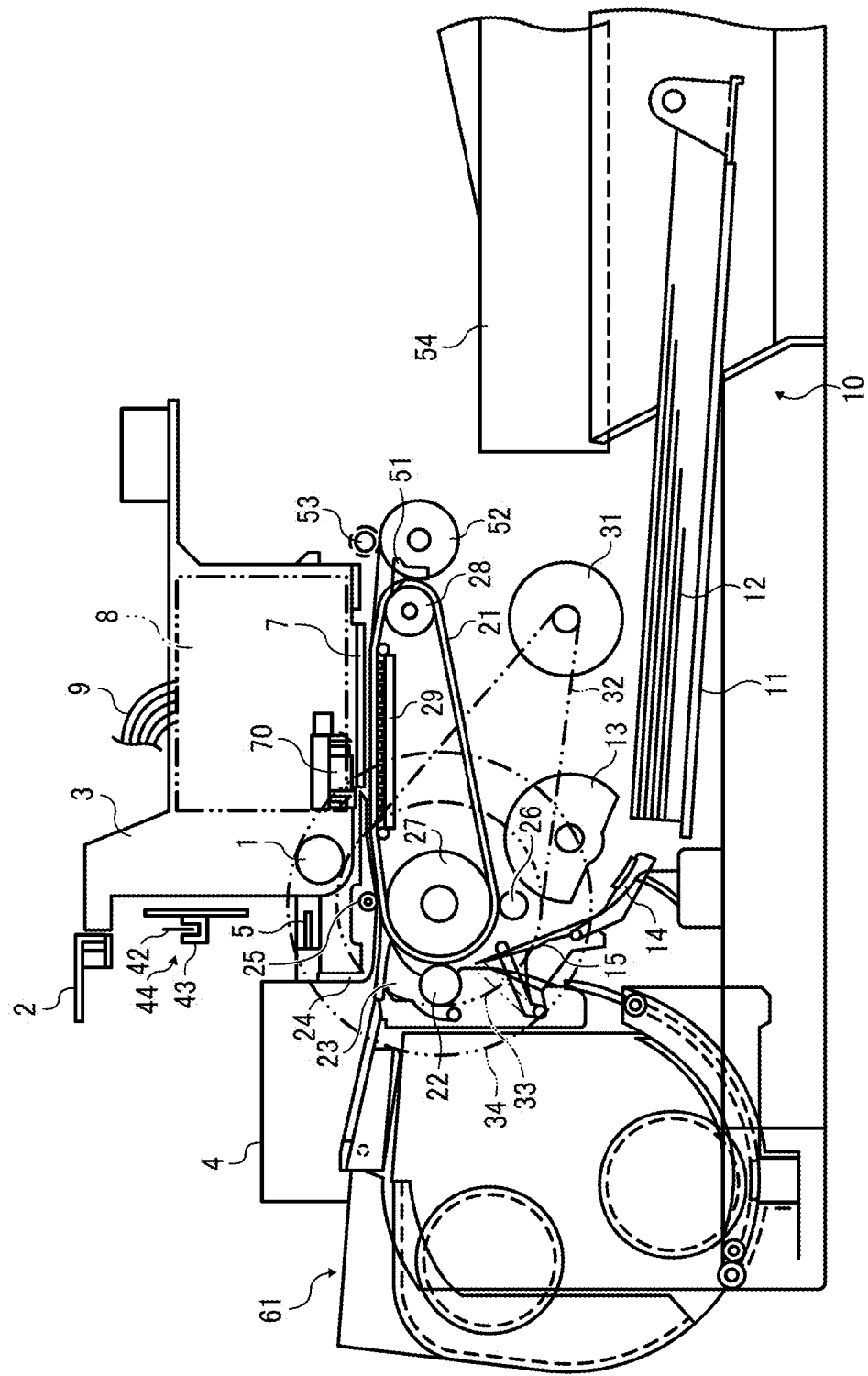

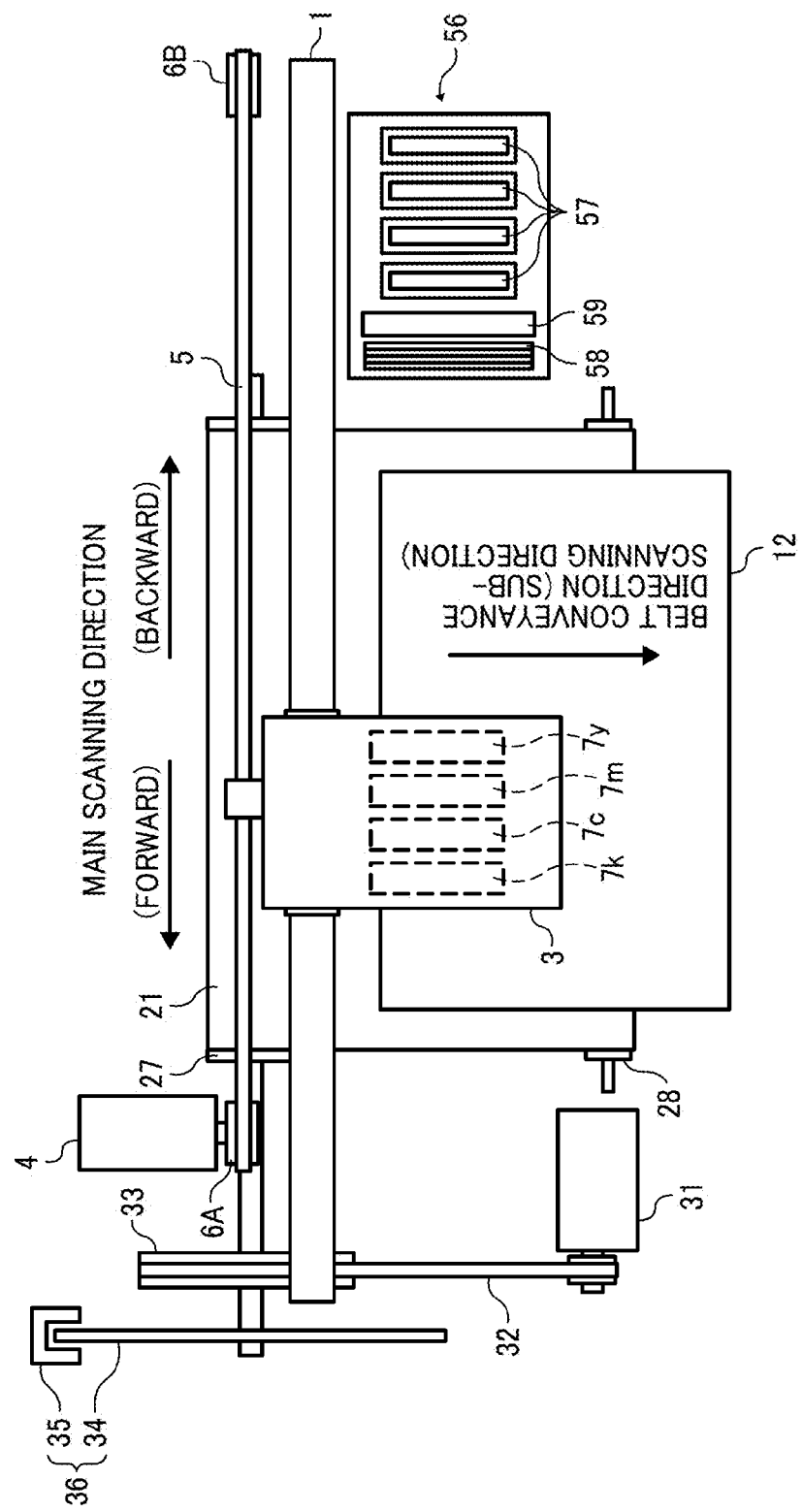

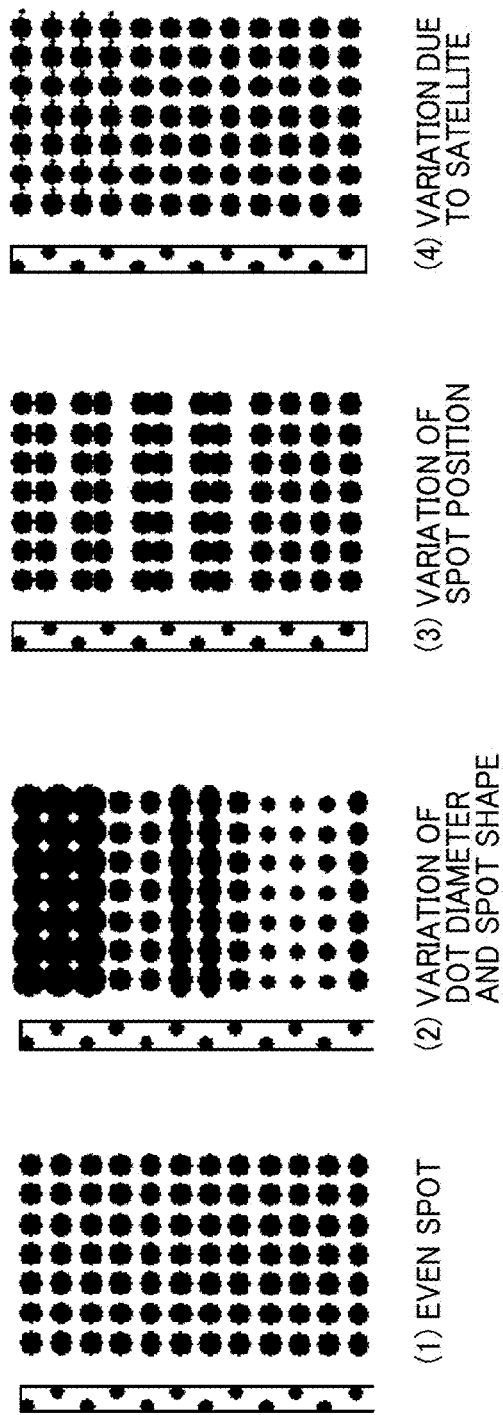

DIFFERENCE IN EFFECT OF VARIATION DEPENDING ON OUTPUT GRADATION

DIFFERENCE IN VARIATION DEPENDING ON RECORD FREQUENCY

DIFFERENCE IN VARIATION DEPENDING ON DROPLET SIZE (a) GENERATION OF TARGETED DENSITY CHARACTERISTIC (b) CALCULATION OF CORRECTED GRADATION

| INPUT GRADATION | OUTPUT GRADATION | | |
|---|---|---|---|
| | AREA 1 | AREA 2 | AREA 3 |
| 0 | 0 | 0 | 0 |
| 32 | 18 | 20 | 24 |
| 64 | 38 | 42 | 50 |
| 96 | 59 | 65 | 77 |
| 128 | 81 | 90 | 106 |
| 160 | 106 | 118 | 137 |
| 192 | 135 | 150 | 172 |
| 224 | 168 | 188 | 211 |
| 256 | 211 | 238 | 256 |

CREATION OF CORRECTION CURVE

CORRECTION CURVE

EXAMPLE 1    EXAMPLE 2

FORM IMAGE BY MOVING HEAD UNIT CONNECTING HEADS IN LONGITUDINAL DIRECTION OF HEADS RECIPROCATORY ORTHOGONAL TO PAPER CONVEYING DIRECTION

RECORDING PAPER

PAPER CONVEYING DIRECTION

LAYOUT INKJET HEADS IN LONGITUDINAL DIRECTION OF HEADS

[PARALLEL LAYOUT]

(IMPLANT SEPARATELY BY EACH HEAD)

(IMPLANT IN SAME PIXEL)

[STAGGERED WITH HALF PITCH LAYOUT]

(c) DENSITY CHARACTERISTIC IN AREA A AND C (d) DENSITY CHARACTERISTIC IN AREA B AND D (a) CORRECTION IN UNITS OF HEADS

○ : PART IN WHICH PRINTING DATA IS MISSED (b) CORRECTION CONSIDERING DENSITY CHARACTERISTIC

PART IN WHICH DOT IS MISSED

◌ : PART IN WHICH MISS IN AREA B IS COMPLEMENTED

IMAGE FORMING APPARATUS, IMAGE FORMING METHOD, AND RECORDING MEDIUM STORING A PROGRAM

CROSS-REFERENCE TO RELATED APPLICATION

This patent application is based on and claims priority pursuant to 35 U.S.C. §119 to Japanese Patent Application No. 2012-176205, filed on Aug. 8, 2012 in the Japan Patent Office, the entire disclosure of which is hereby incorporated by reference herein.

BACKGROUND

1. Technical Field

The present invention relates to an image forming apparatus, image forming method, and recording medium storing a program.

2. Background Art

It is difficult to satisfy demand for high-resolution and high-speed printing capabilities by conventional multi-pass printing. Generally, high-speed printing can be achieved by improving resolution of a recording head. Since it is technically difficult to manufacture nozzles with a narrow pitch, typically multiple printer heads are disposed in parallel but offset half a pitch in the direction of the nozzle row to improve the resolution of the recording head. However, irregularity in image density occurs due to differences in ejection characteristics among adjacent recording heads since it is comprised of multiple recording heads.

Conventionally, correction technologies that shift the whole recording head and eliminate these differences by adjusting the driving waveform applied to the recording heads (e.g., JP-H04-133741-A) or executing gradation correction (e.g., JP-2005-280068-A) have been proposed. Also, a technology to correct density distribution within a given recording head in units of nozzles or a block comprised of multiple nozzles has been proposed as well.

However, in the conventional correction technologies described above, while it is possible to keep uniformity of gradation, quality of granularity deteriorates since image granularity is not considered.

SUMMARY

The present invention provides an image forming apparatus that includes multiple recording heads laid out in parallel that include multiple nozzles that eject liquid droplets in different sizes, and the image forming apparatus forms an image by ejecting the liquid droplets onto a recording medium from the recording heads. The image forming apparatus includes the recording heads divided into multiple blocks per predefined number of nozzles. The image forming apparatus includes a measurement unit that measures density on the recording medium per in units of a divided block and a correction unit that corrects characteristic of density per recording heads that comprise a block whose density is the highest.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIGS. 1A and 1B are diagrams illustrating a configuration of an image forming apparatus as an embodiment of the present invention.

FIGS. 8A, 8B, 8C, and 8D are diagrams illustrating causes of density unevenness.

DETAILED DESCRIPTION

Figure 2A:
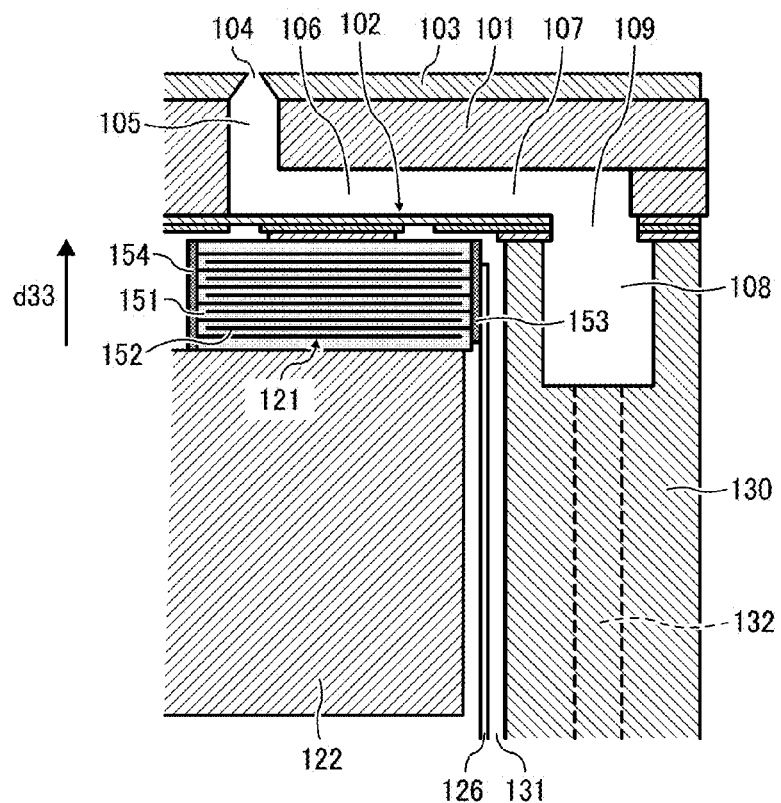
FIGS. 2A and 2B are diagrams illustrating a configuration of a liquid ejecting recording head as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

The main purpose of the present invention is to cope with the issues in the conventional correction technologies (e.g., JP-H04-133741-A and JP-2005-280068-A) and provide an image forming apparatus, image forming method, and recording medium storing a program that improves density unevenness of image and image uniformity and keeps granularity from deteriorating.

FIGS. 1A and 1B are diagrams illustrating a configuration of an image forming apparatus of the present invention. FIG. 1A is a diagram illustrating a configuration of the image forming apparatus viewed from the side, and FIG. 1B is a diagram illustrating a plan view configuration of the image forming apparatus. The image forming apparatus holds a carriage 3 slidably in the main scanning direction by a guide rod 1 and a guide rail 2 as guiding members laid across side panels laterally (not shown in figures) and moves the carriage 3 as a recording head scanning unit scanning in the arrow direction (in the main scanning direction) shown in FIG. 1B via a timing belt 5 put between a driving pulley 6A and a driven pulley 6B driven by a main scanning motor 4.

In the carriage 3, for example, four recording head units 7y, 7c, 7m, and 7k that include liquid ejecting recording heads that eject yellow (Y), cyan (C), magenta (M), and black (K) ink droplets respectively laying multiple ink ejecting nozzles out perpendicular to the main scanning direction and being mounted so that the ink droplets are ejected downward. The carriage 3 includes sub-tanks 8 for each color to supply ink for each color to the recording head 7. A main tank (ink cartridge, not shown in figures) refills the sub-tank 8 with ink via an ink supplying tube 9.

A liquid ejecting recording head that comprises the recording head 7 includes a pressure generator that generates pressure to eject droplets, such as a piezoelectric actuator, a thermal actuator that uses phase change by film boiling of liquid using an electro-thermal conversion element such as a heating resistor, a memory metal actuator that uses phase change of metal by temperature variation, and an electrostatic actuator that uses electrostatic force. Also, the recording head 7 is not limited to recording heads independent for each color and instead can be comprised of one or more recording head members (liquid ejecting recording heads) that include nozzle rows comprised of multiple nozzles that eject multicolor droplets.

On the other hand, a paper feeding roller 13 that separates and feeds a sheet of paper 12 one by one from a paper loading unit 11 and a separating pad 14 opposite to the paper feeding roller 13 and comprised of a material whose friction coefficient is high are included as a paper feeder to feed the paper 12 onboard on the paper loading unit 11 such as a paper feeding cassette 10, and the separating pad 14 is biased to the paper feeding roller 13.

Also, a conveyance belt 21 that conveys the paper 12 attached electrostatically, a counter roller 22 that conveys the paper 12 fed via a guide 15 from the paper feeding unit and sandwiched between the counter roller 22 and the conveyance belt 21, a conveyance guide 23 that turns the paper 12 conveyed substantially upward in the vertical direction 90 degrees substantially along the conveyance belt 21, and a holding roller 25 biased to the conveyance belt 21 by a holding member 24 are included as a conveyance unit that conveys the paper 12 fed from the paper feeder at downstream side of the recording head 7. Also, a charging roller 26 as a charging unit that charges the surface of the conveyance belt 21 is included.

The conveyance belt 21 is endless, set across a conveyance roller 27 and a tension roller 28, and configured to rotate in the belt conveying direction shown in FIG. 1B (in the sub-scanning direction) by rotating the conveyance roller 27 by a sub-scanning motor 31 via a timing belt 32 and a timing roller 33. It should be noted that a guide member 29 corresponding to an image forming area by the recording head 7 is disposed in the backside of the conveyance belt 21. Also, the charging roller 26 touches the front surface of the conveyance belt 21 and rolls along with the conveyance belt 21.

Also, as shown in FIG. 1B, a slit disk 34 is mounted at the axis of the conveyance roller 27, and the slit disk 34 and a sensor that detects a slit of the slit disk 34 are comprised of a rotary encoder 36.

Furthermore, a separating hook 51 that separates the paper 12 from the conveyance belt 21, an ejecting roller 52, an ejecting roller 53, and an output tray 54 that stocks the output paper 12 are provided as well.

Also, a duplex feeding unit 61 is mounted in the backside removably. The duplex feeding unit 61 fetches the paper 12 returned by the reverse rotation of the conveyance belt 21, turns over the paper 12, and feeds the paper 12 between the counter roller 22 and the conveyance belt 21 again.

Furthermore, as shown in FIG. 1B, a maintenance recovery unit (a maintenance unit) 56 that cleans the nozzles in the recording head 7 is located in a non-print area on the other side of the carriage 3 in the main scanning direction. The maintenance unit 56 includes caps 57 that cap the nozzle side of the recording head 7, a wiper blade 58 that wipes the nozzle side of the recording head 7, and a dummy-ejection receptacle 59 that receives droplets dummy-ejected to eject viscous recording liquid droplets that does not contribute to recording.

In the image forming apparatus configured as described above, the paper feeding unit conveys paper 12 one by one separately, the guide 15 guides the paper 12 conveyed substantially upward in the vertical direction, the paper 12 is conveyed between the conveyance belt 21 and the counter roller 22, the front edge of the paper 12 is guided by the conveyance guide 23 and pressed to the conveyance belt 21 by the pressing roller 25, and the paper 12 turns 90 degrees substantially. At this point, a controller (not shown in figures) has an AC bias supply apply alternate voltage that repeats plus and minus voltages alternately to the charging roller 26 and charges the conveyance belt 21 in an alternating charged voltage pattern that repeats at predefined intervals in the sub-scanning direction (rotating direction). If the paper 12 is conveyed on the charged conveyance belt 21, the paper 12 is stuck to the conveyance belt 21 by electrostatic force and conveyed to the sub-scanning direction by rotation of the conveyance belt 21.

Subsequently, by driving the recording head 7 in accordance with an image signal moving the carriage 3 back and forth, one line is recorded by ejecting ink droplets on the still paper 12. After conveying the paper 12 at predefined distance, next line is recorded. After receiving a record finish signal or a signal that indicates that the rear edge of the paper 12 reaches at recording area, it finishes recording and ejects the paper 12 on the output tray 54.

Also, in case of duplex printing, after finishing recording on the front side (on which printing is executed firstly), the recorded paper 12 is sent to the duplex feeding unit 61 by counterrotating the conveyance belt 21, turned over (so that the back side becomes print side), and sent between the counter roller 22 and the conveyance belt 21 again. Subsequently, after performing timing control, the paper 12 is carried on the conveyance belt 21, performed printing on the back side as described above, and ejected on the output tray 54.

The carriage 3 is moved to the side of the maintenance unit 56 while waiting for printing (recording), and the nozzle side of the recording head 7 is covered by the caps 57 to prevent ejection failure due to dried ink by keeping the nozzles wet. Also, a recovery operation is performed to eject viscous recording liquid and air bubbles by vacuuming recording liquid up from the nozzles while the recording head 7 is covered by the caps 57, and a wiping operation is performed with the wiper blade 58 to wipe out ink attached to the nozzle side of the recording head 7 by the recovery operation. Consequently, stable ejection performance of the recording head 7 is maintained.

Figure 2B:
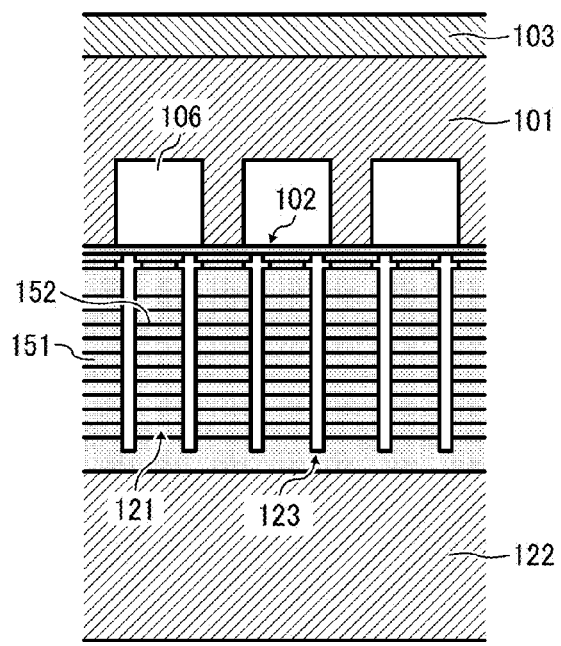

Next, an example of a liquid ejecting recording head that comprises the recording head 7 will be described below with reference to FIGS. 2A and 2B. FIG. 2A is a cross-sectional diagram illustrating the liquid ejecting recording head in the longitudinal direction of a liquid chamber, and FIG. 2B is a cross-sectional diagram illustrating the liquid ejecting recording head in the latitudinal direction (direction in which nozzles are layout) of the liquid chamber.

The liquid ejecting recording head is constructed by laminating a fluid channel board 101, e.g., formed by performing anisotropic etching on a single-crystal silicon substrate, a diaphragm 102 connected under the fluid channel board e.g., formed by nickel electroplating, and a nozzle board 103 connected on the fluid channel board 101 by connecting with each other to form a nozzle communication channel 105 with which the nozzle 104 that ejects liquid droplets (ink droplets) communicate, a liquid chamber 106 that generates pressure, and a ink supply port 109 that communicates with a common liquid chamber 108 to supply ink to the liquid chamber 106 through a liquid resistor unit (supply channel) 107 etc.

Also, the liquid ejecting recording head includes a laminated piezoelectric element 121 as an electromechanical converting element as a pressure generator (actuator unit) that increases ink pressure in the liquid chamber 106 by deforming the diaphragm 102 laid out in two rows and a base board 122 that mounts the piezoelectric element 121. There is a column part 123 between the piezoelectric elements 121. While the column part 123 is formed at the same time as the piezoelectric element 121 by processing and dividing a piezoelectric material, the column part 123 works just as a column since driving voltage is not applied to the column part 123.

Furthermore, a flexible printed circuit (FPC) cable 126 that includes a driving circuit (drive IC) not shown in figures is connected to the piezoelectric element 121. A periphery of the diaphragm 102 is connected to a frame part 130. A reentrant part as a penetration part 131 that houses an actuator unit comprised of the piezoelectric element 121 and the base board and a common liquid chamber 108 and a ink supplying port 132 to supply ink to the common liquid chamber 108 from outside are formed on the frame part 130. For example, the frame part 130 is formed by performing injection molding with thermosetting resin such as epoxy resin or polyphenylene sulfide.

A reentrant part and a hole as the nozzle communication channel 105 and the liquid chamber 106 are formed on the fluid channel board 101 by performing anisotropic etching on a single-crystal silicon substrate with crystal orientation (110) using an alkaline etching liquid such as solution of potassium hydroxide (KOH). This operation is not limited to the single-crystal silicon substrate, and other stainless substrate and photosensitive resin can be used for the fluid channel board 101.

The diaphragm 102 is formed by performing, e.g., electroplating on a nickel metal plate. The diaphragm 102 can also be formed using another metal plate or a part that laminates metal and resin board. The piezoelectric element 121 and the column part 123 are connected on the diaphragm 102 using an adhesive, and the frame part 130 is connected to them using an adhesive.

The nozzle 104 whose diameter is 10-30 μm corresponding to each of the liquid chamber 106 is formed on the nozzle board 103, and the nozzle board is connected to the fluid channel board 101 using an adhesive. The nozzle board 103 is constructed by forming a water-shedding layer on a top surface upon a surface of a nozzle forming part made of metal via a required layer.

The piezoelectric element 121 is the laminated piezoelectric element (PZT) that laminates a piezoelectric material 151 and an inner electrode 152 alternately. An individual electrode 153 and a common electrode 154 are connected to each of the inner electrode 152 drawn on alternately different edge of the piezoelectric element 121. In the example described above, a configuration that increases ink pressure in the liquid chamber 106 by using displacement in the d33 direction as the piezoelectric direction of the piezoelectric element 121 is described. Alternatively, another configuration that increases ink pressure in the liquid chamber 106 by using displacement in the d31 direction as the piezoelectric direction of the piezoelectric element 121 or includes one row of piezoelectric element 121 can be used.

In the liquid ejecting recording head configured as described above, for example, after shrinking the piezoelectric element 121 by lowering voltage applied to the piezoelectric element 121 below standard voltage, the ink flows in the liquid chamber 106 since the capacity of the liquid chamber 106 increases by descent of the diaphragm 102. Subsequently, the recording liquid droplet is ejected from the nozzle 104 by shrinking the capacity of the liquid chamber 106 by deforming the diaphragm 102 in the direction of the nozzle 104 and extending the piezoelectric element 121 in the laminating direction by increasing voltage applied to the piezoelectric element 121 and increasing the pressure of the recording liquid in the liquid chamber 106.

Next, the diaphragm 102 returns to its initial position by applying standard voltage to the piezoelectric element 121 again, and the liquid chamber 106 is filled with the recording liquid from the common liquid chamber 108 since the liquid chamber 106 generates a negative pressure by its expansion. After vibration of meniscus surface of the nozzle 104 decays, the liquid ejecting recording head transitions to an operation to eject a next liquid droplet. The driving method of the liquid droplet ejecting recording head is not limited to push-pull shooting described above, and alternatively, pull shooting and push shooting can be used by providing an appropriate driving waveform.

Figure 3:
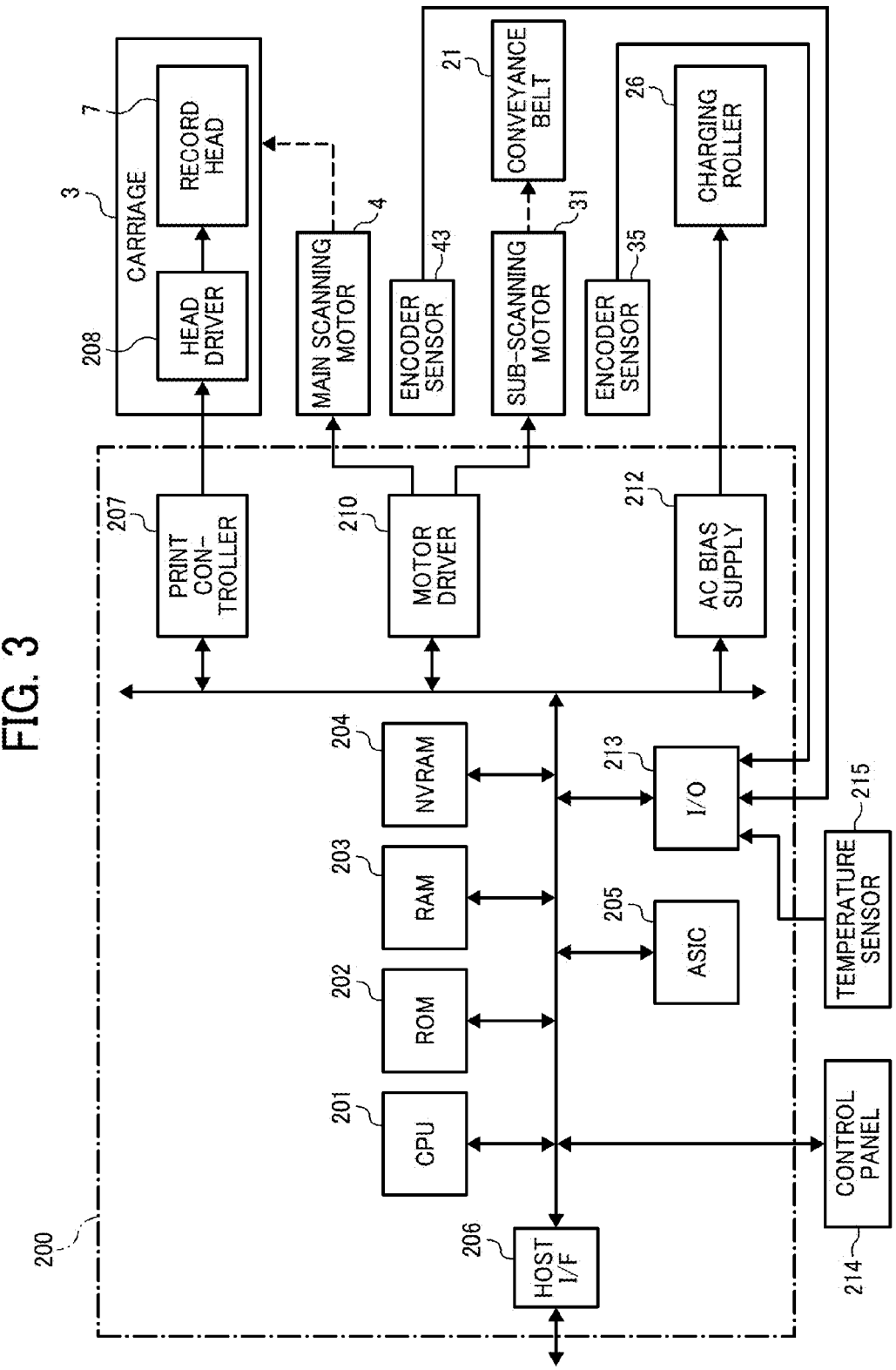
FIG. 3 is a block diagram illustrating a configuration of a print controller as an embodiment of the present invention.

FIG. 3 is a block diagram illustrating a configuration of a print controller in the image forming apparatus. A print controller 200 is comprised of a CPU 201 that controls the whole image forming apparatus, a ROM 202 that stores programs that the CPU 201 executes and other fixed data, a RAM 203 that stores image data, etc., temporarily, a rewritable nonvolatile memory 204 that stores data during power-off of the apparatus, and an ASIC 205 that performs image processing that performs various signal processing such as sorting on image data and input/output signal processing. The image forming apparatus includes a head driver (driver) IC 208 that drives the recording head 7 included in the carriage 3.

Also, the print controller 200 includes an I/F 206 that sends/receives data and signals to/from a host, a data transfer unit that drives and controls the recording head 7, a print controlling unit 207 that includes a drive waveform generator to generate drive waveform, a motor driver 210 that drives the main scanning motor 4 and the sub-scanning motor 31, an AC bias supply 212 that supplies AC bias to the charging roller 26, and an I/O 213 that inputs detection signals from various sensors such encoder sensors 43 and 35 and a temperature sensor 215 that detects temperature in the recording head and environmental temperature.

A control panel 214 that inputs and displays information for the image forming apparatus is connected to the print controller 200.

In this embodiment, the inside of the recording head is divided into four blocks, and temperature in each block is measured. The temperature around the nozzle can be measured by laying out a thermistor in the center of the block or using an infrared-based noncontact thermometer. While the temperature is measured at a fixed point with the thermistor embedded in the recording head, the temperature can be measured at any point with the noncontact thermometer.

The host I/F 206 in the print controller 200 receives image data etc. sent from a host such as an image processing apparatus such as a PC, an image scanner, and a image capture such as a digital camera via a cable or a network.

Also, the CPU 201 in the print controller 200 reads and analyzes image data in a receive buffer included in the host I/F 206, executes processing image and sorting data for the ASIC 205, and transfers the processed print data to the head driver 208 from the print controlling unit 207. A printer driver in the host can generate dot pattern data to output image (print data) as described later.

The print controlling unit 207 transfers the serialized print data described above with transfer clock to transfer the print data and ascertain the transfer, a latch signal, and a droplet control signal (a mask signal) to the head driver 208. Also, the print controlling unit 207 includes a digital-analog converter that performs digital-analog conversion on pattern data of a driving signal stored in the ROM 202, a drive waveform generator comprised of a voltage amplifier and a current amplifier etc., and a drive waveform selector to select a drive waveform for the head driver 208. The print controlling unit 207 generates a drive waveform comprised of one drive pulse (drive signal) or multiple drive pulses (drive signals) and outputs the generated drive waveform to the head driver 208.

The head driver 208 drives the recording head 7 by applying the drive signal that comprises the drive waveform sent from the print controlling unit 207 based on serial print data corresponding to one line of the recording head 7 to a driving element (e.g., piezoelectric element) that generates energy to eject the droplet of the recording head 7 selectively. At this time, by selecting a part or all of the driving pulses forming the driving waveform, the recording head 7 can selectively eject different sizes of droplets, e.g., large droplets (large dots), medium droplets (medium dots), and small droplets (small dots) to form different sizes of dots onto a recording medium.

After calculating driving power value (control value) for the main scanning motor 4 based on velocity detection value and position detection value acquired by sampling detection pulses from the encoder sensor 43 that comprises the linear encoder and velocity target value and position target value acquired from velocity and position profile stored preliminarily, the CPU 201 drives the main scanning motor 4 via the motor driver 210. Similarly, after calculating driving power value (control value) for the sub-scanning motor 31 based on velocity detection value and position detection value acquired by sampling detection pulses from the encoder sensor 35 that comprises the rotary encoder 36 and velocity target value and position target value acquired from velocity and position profile stored preliminarily, the CPU 201 drives the sub-scanning motor 31 via the motor driver 210.

Figure 4A:
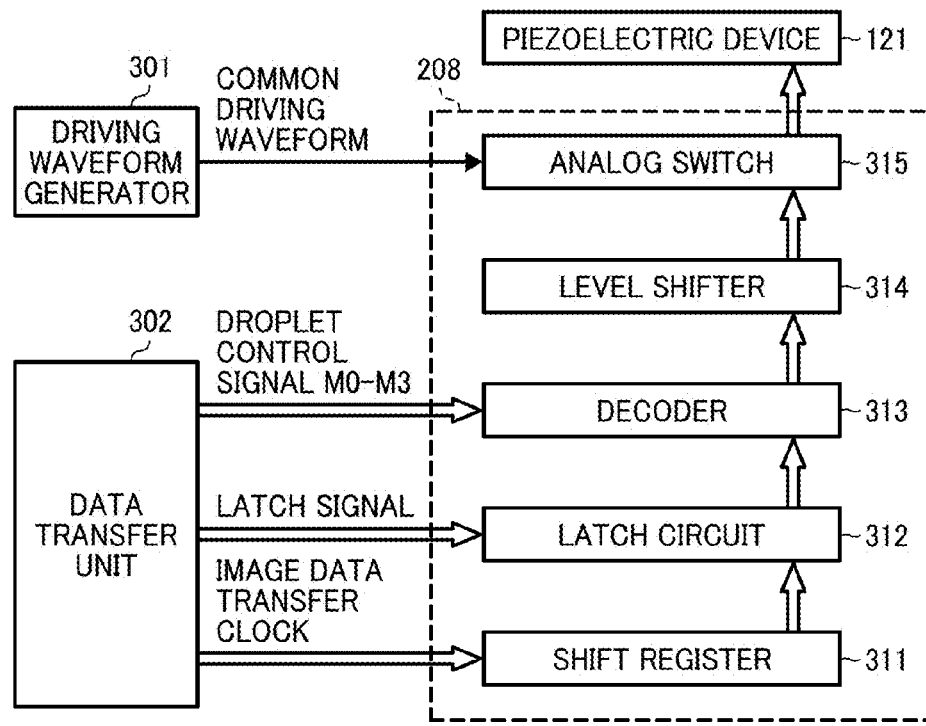
FIGS. 4A and 4B are diagrams illustrating a configuration of a head driver as an embodiment of the present invention.

FIG. 4A is a diagram illustrating a configuration of the print controlling unit 207 and the head driver 208. As described above, the print controlling unit 207 includes a drive waveform generator 301 that generates and outputs a drive waveform (common drive waveform) comprised of multiple drive pulses (drive signals) in one printing period and a data transfer unit 302 that outputs print data corresponding to print image in two bits (gradation signal 0 and 1), a clock signal, a latch signal (LAT), and droplets control signals M0-M3.

The droplet control signal is a 2-bit signal that commands to open and close an analog switch 315, described later, as a switching unit in the head driver 208 for each droplet. The droplet control signal transitions to H level (on) in case of a waveform to be selected in response to print period of the common drive waveform and L level (off) in case of not being selected.

The head driver 208 includes a shift register 311 that inputs transfer clock (shift clock) and serialized print data (gradation data, 2 bits per channel) from the data transfer unit 302, a latch circuit 312 that latches each register value of the shift register 311 using the latch signal, a decoder 313 that decodes the gradation data and the droplet control signal M0-M3 and outputs the decoded result, a level shifter 314 that converts the logic-level voltage signal output by the decoder 313 to a signal whose level can turn an analog switch 315, and the analog switch 315 turned on and off (open and close) by the output of the decoder 313 provided via the level shifter 314.

The analog switch 315 is connected to a selected electrode (individual electrode) 153 of each of the piezoelectric element 121, and the common drive waveform from the driving waveform generator 301 is input to the analog switch 315. Consequently, after the analog switch 315 is turned on in response to the decoding result of the serialized print data (gradation data) and the droplet control signal M0-M3 by the decoder 313, predefined driving signal that comprises the common drive waveform passes the analog switch 315 (i.e., the driving signal is selected) and is applied to the piezoelectric element 121.

Figure 4B:
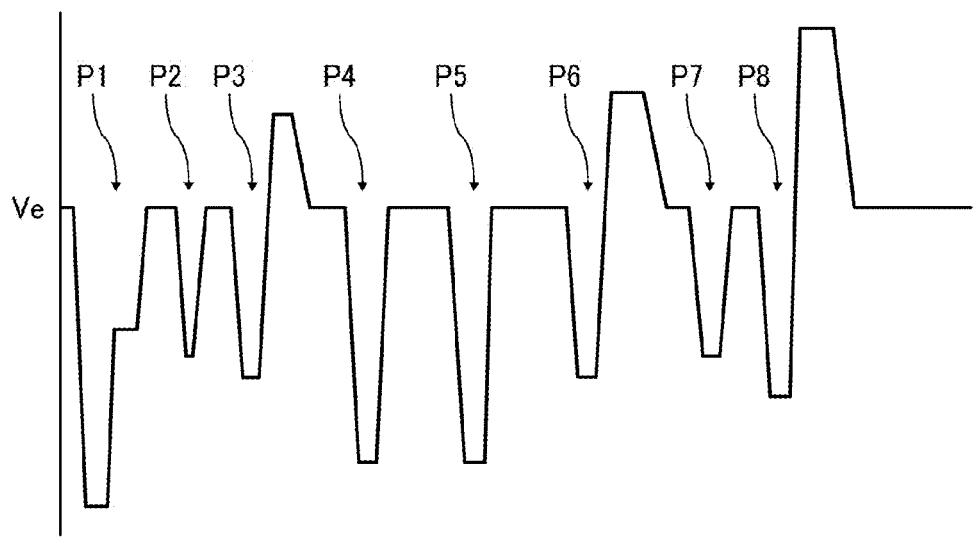
Figure 5A:
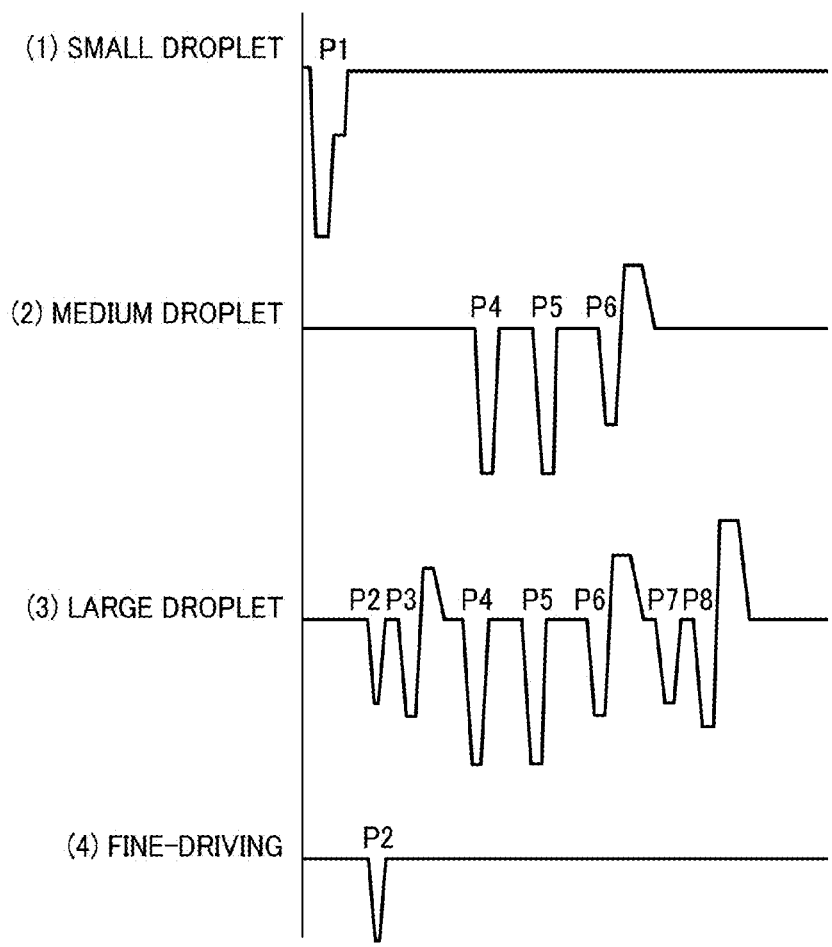
FIGS. 5A and 5B are diagrams illustrating driving waveforms as an embodiment of the present invention.

FIG. 4B and FIG. 5A are diagrams illustrating drive waveforms. The drive waveform generator 301 generates and outputs the driving signal (drive waveform) that includes eight driving pulses P1-P8 comprised of a waveform element that drops from the standard voltage Ve and a waveform element that rises after dropping in one print period (one driving period) as shown in FIG. 4B. The one print period is determined depending on the maximum driving frequency. Also, a driving pulse to be used is selected by the droplet control signals M0-M3 from the data transfer unit 302.

The waveform element whose voltage V of the driving pulse drops from the standard voltage Ve is a pulling waveform element that shrinks the piezoelectric element 121 and expands the capacity of the pressurized liquid chamber 106. Also, the waveform element that rises after dropping is a pushing waveform element that expands the piezoelectric element 121 and shrinks the capacity of the pressurized liquid chamber 106.

Also, by using the droplet control signals M0-M3 from the data transfer unit 302, the driving pulse P1 is selected in case of forming the small droplet (small dot) as shown in FIG. 5A(1), the driving pulse from P4 to P6 is selected in case of forming the medium droplet (medium dot) as shown in FIG. 5A(2), the driving pulse from P2 to P8 is selected in case of forming the large droplet (large dot) as shown in FIG. 5A(3), and the fine driving pulse P2 is selected in case of fine driving (vibrating meniscus without ejecting a droplet) as shown in FIG. 5A(4), and the selected driving pulse is applied to the piezoelectric element 121 in the recording head 7.

In case of forming the medium droplet, the driving pulse P4 ejects the first droplet, the driving pulse P5 ejects the second droplet, and the driving pulse p6 ejects the third droplet. Subsequently, those three droplets become united during the flight and land on the recording medium as one droplet. At this point, assuming the characteristic vibration period of the pressurized chamber (liquid chamber 106) as Tc, the interval between ejection by the driving pulse P4 and P5 is preferably $2Tc \pm 0.5$ μs. Since the driving pulse P4 and P5 are comprised of simple pull-shooting waveform, velocity of the ink droplet can become too fast and the landing point of the droplet can be different from the landing point of other kinds of droplets if the driving pulse P6 is also comprised of the same simple pull-shooting waveform. To cope with this issue, in the driving pulse P6, the meniscus is pulled less and the velocity of the third droplet is slowed by making pulling voltage less (less dropping voltage). However, the rising voltage does not decline in order to make necessary capacity of ink droplet large.

That is, the droplet ejecting velocity by the last driving pulse becomes relatively slow by making the pulling voltage relatively small in the pulling waveform element of the last driving pulse, and that fits the landing point of the last driving pulse into the landing points of other kinds of droplets as much as possible.

Also, the fine driving pulse P2 vibrates the meniscus without ejecting the droplet in order to prevent the meniscus of the nozzle from drying out. This fine pulse P2 is applied to the recording head 7 in a non-printing area. Also, shortening of driving frequency (high-speeding) can be achieved by using the fine driving pulse P2 as one of the driving pulses that comprise the large droplet.

Furthermore, the capacity of the ink droplet ejected by the driving pulse P3 can become large by setting interval between the fine driving pulse P2 and the ejection by the driving pulse P3 to range within the characteristic vibration period Tc±0.5 µs. That is, the capacity of the droplet ejected by the driving pulse P3 becomes larger than a case that the single driving pulse P3 is applied by imposing expansion of the pressurized liquid chamber 106 by the driving pulse P3 on pressure vibration of the pressurized liquid chamber 106 by vibration period generated by the fine driving pulse P2.

Figure 5B:
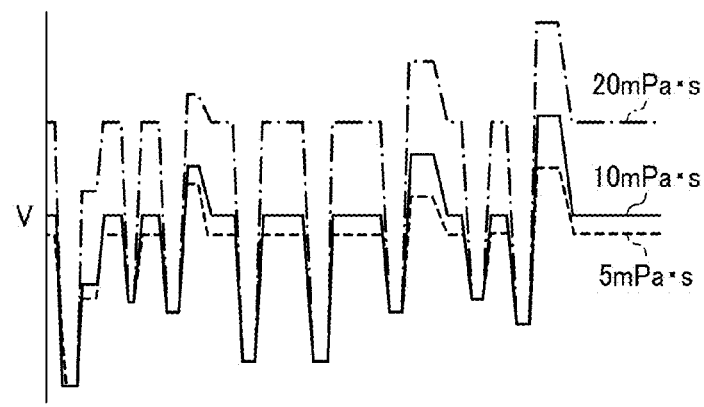

Since a drive waveform differs depending on viscosity of ink, in the image forming apparatus of this embodiment, the drive waveform in case ink viscosity is 5 mPa·S, the drive waveform in case ink viscosity is 10 mPa·S, and the drive waveform in case ink viscosity is 20 mPa·S are prepared as shown in FIG. 5B, and the drive waveform to be used is selected by determining ink viscosity from temperature detected by the temperature sensor 215.

That is, the velocity and the capacity of the ejected ink droplet can be kept approximately stable regardless of ink viscosity (temperature) by making voltage of the driving pulse relatively small in case ink viscosity is low and making voltage of the driving pulse relatively large in case ink viscosity is high. Also, the driving pulse P2 can vibrate the meniscus without ejecting the droplet by choosing the highest voltage of the waveform in accordance with the ink viscosity.

As described above, assuming the same ink viscosity, increase and decrease of drive waveform results in increase and decrease of ejecting amount of ink droplet as shown in FIG. 5B. That is, increase of drive waveform results in increase of ejecting amount of droplets, and density of image becomes dark.

The flight time of the large, medium, and small droplet until landing on the recording medium can be controlled by using a drive waveform comprised of driving pulses described above, and the large, medium, and small droplets can be landed on approximately the same point even if the ejecting start time is different among the large, medium, and small droplet.

Figure 6A:
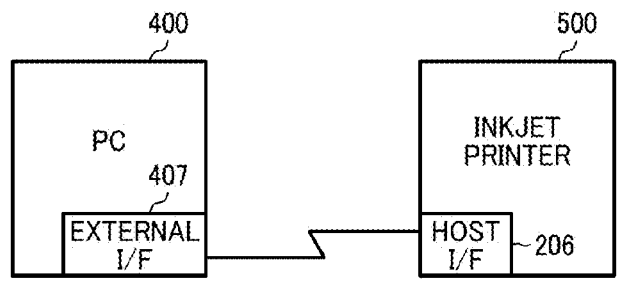
FIGS. 6A, 6B, and 6C are diagrams illustrating a configuration of an image forming system as an embodiment of the present invention.

FIG. 6A is a diagram illustrating a configuration of an image forming system comprised of the image processing apparatus that includes a program to output a print image and the inkjet printer as the image forming apparatus in this embodiment.

The print system (image forming system) is comprised of one or more image processing apparatuses 400 such as PCs and the inkjet printer 500, and they are connected with each other via a predefined interface or a network.

Figure 6B:
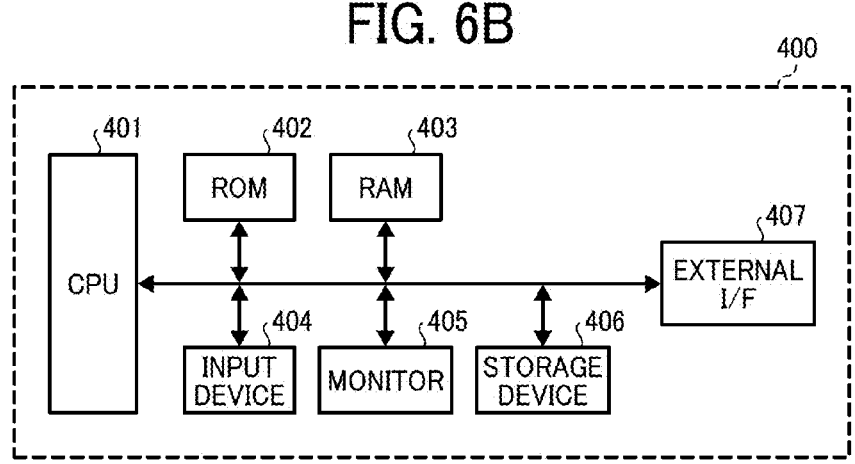

As shown in FIG. 6B, in the image processing apparatus 400, the CPU 401, the ROM 402, and the RAM 403 are connected with each other via a bus. A storage device 406 such as a hard disk drive, an input device 404 such as a mouse and a keyboard, a monitor 405 such as a LCD and a CRT, a storage medium reading device such as an optical disk drive (not shown in figures), and an interface 407 (external I/F) that communicates with a network such as internet and an external device such as a USB device are connected to the bus via a predefined interface.

The storage device 406 in the image processing apparatus 400 stores image processing programs that include a program in this embodiment. The image processing programs have been installed on the storage device 406 after being read from the storage medium using the storage medium reading unit or downloaded from the network such as internet. The image processing apparatus 400 can perform image processing described below by installing the image processing programs. The image processing programs can operate on a predefined operating system, or the image processing programs can comprise a part of predefined application software.

While the image processing method in this embodiment can be implemented by the inkjet printer, the inkjet printer in this embodiment does not have a function that generates dot patterns actually recorded after receiving a command to draw an image or print a character. That is, after commanding to print from application software etc. executed on the image processing apparatus 400, the printer driver in this embodiment implemented as software in the image processing apparatus 400 (host computer) performs image processing and multivalic record dot patterns outputtable by the inkjet printer 500 are generated. Subsequently, after rasterizing the generated multivalic record dot patterns, they are transferred to the inkjet printer 500, and the inkjet printer 500 outputs them.

Specifically, in the image processing apparatus 400, commands to draw an image or print a character from applications and the operating system (e.g., commands that describe position, thickness, and shape etc. of a line to be recorded or size and position etc. of a character to be recorded) are stored in a drawing data memory temporarily. These commands are written in predefined print description language.

Next, after a rasterizer interprets the commands stored in the drawing data memory, the command is converted into record dot patterns in accordance with the specified position and thickness etc. in case of the command to draw a line, the command is converted into record dot patterns in accordance with the specified position and size after acquiring outline data of corresponding character from font outline data stored in the image processing apparatus (host computer) 400 in case of the command to print a character, and the command is converted into record dot patterns as is in case of image data.

Subsequently, after performing an image processing on these record dot patterns, they are stored in a raster data memory. At this point, the image processing apparatus 400 rasterizes into record dot patterns data by considering orthogonal grid as reference record position. Processes such as a color management process (CMM) to adjust colors, a gamma correction process, a halftone process such as dithering and error diffusion, a background eliminating process, and a total amount of ink control process are taken as examples of the image processing. Subsequently, the record dot patterns stored in the raster data memory are transferred to the inkjet printer 500 via an interface.

In case of performing copying with the inkjet printer 500, the inkjet printer 500 needs to perform processes such as the halftone process on the record dot pattern described above. In that case, the print controlling unit 207 performs processes described above on the scanned image data and generates record dot patterns performed the halftone process. The record dot pattern is referred to as the print data. The case in which the image processing apparatus 500 performs the halftone process etc. and transfers the print data to the inkjet printer 500 will be described below.

In this embodiment, one-pass printing that forms an image with one main scanning on the record medium can be used as a recording method, and multi-pass printing that forms an image by performing main scanning for multiple times (multi-pass printing) with same nozzles or different nozzles on the same area of the record medium can be used as a recording method. These different recording methods can be combined accordingly.

Figure 6C:
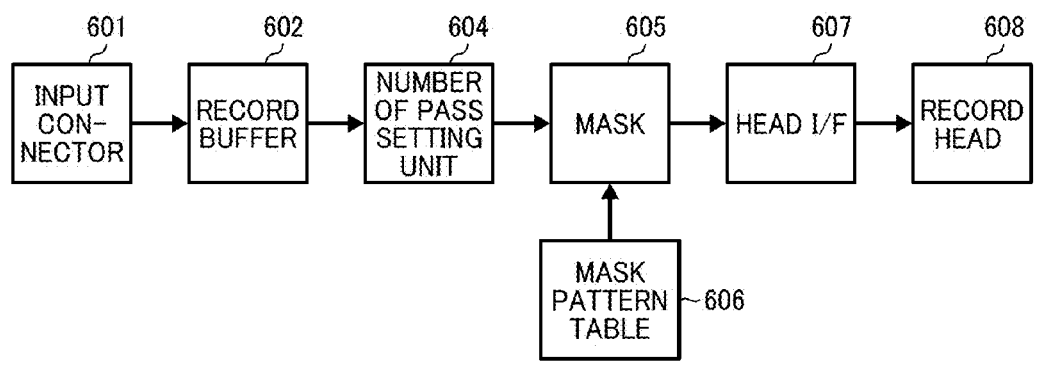

Here, the multi-pass printing will be described below. FIGS. 6A, 6B, and 6C are diagrams illustrating a configuration of the image forming apparatus, and the image forming apparatus includes an input connector 601, a record buffer 602, a number of pass determining unit 604, a mask processor 605, a mask pattern table 606, a recording head interface unit 607, and a recording head 608.

A record buffer controller stores bitmap data (print data) sent from the image processing apparatus 400 in predefined address in the record buffer 602. The record buffer 602 has a capacity that can store bitmap data for a single scan and sheet feeding amount and comprises a ring buffer in units of sheet feeding amount such as a FIFO memory.

The record buffer controller controls the record buffer 602, starts the printer engine after bitmap data for a single scan is stored in the record buffer, reads the bitmap data from the record buffer 602 in accordance with position of each nozzle of the recording head, and inputs the read bitmap data into the number of pass determining unit 604. Also, after inputting bitmap data for next scanning from the input connector 601, the record buffer controller controls the record buffer 602 to store the input bitmap data in an empty area (corresponding to sheet feeding amount that finishes recording) in the record buffer 602.

The number of pass determining unit 604 determines a number of dividing pass and outputs the number of pass to the mask processor 605. The mask pattern table chooses a mask pattern in response to the determined number of dividing pass from a stored mask pattern table preliminarily, e.g., mask patterns for one-pass recording, two-pass recording, four-pass recording, and eight-pass recording, and outputs the chosen mask pattern to the mask processor 605.

After the mask processor 605 outputs bitmap data stored in the record buffer 602 to the recording head driver 208 masking for each recording pass using the mask pattern, the recording head driver 208 sorts the masked bitmap data in the order that the recording head 608 uses and transfers it to the recording head 608.

For example, the record buffer 602 is implemented by the RAM 203, and the mask pattern table is stored in the ROM 202. Also, the number of pass determining unit 604 and the mask processor 605 are implement by either the combination of the print controlling unit 207 and the CPU 201 or the CPU 201. The record buffer controller is implemented by the CPU 201.

Figure 7A:
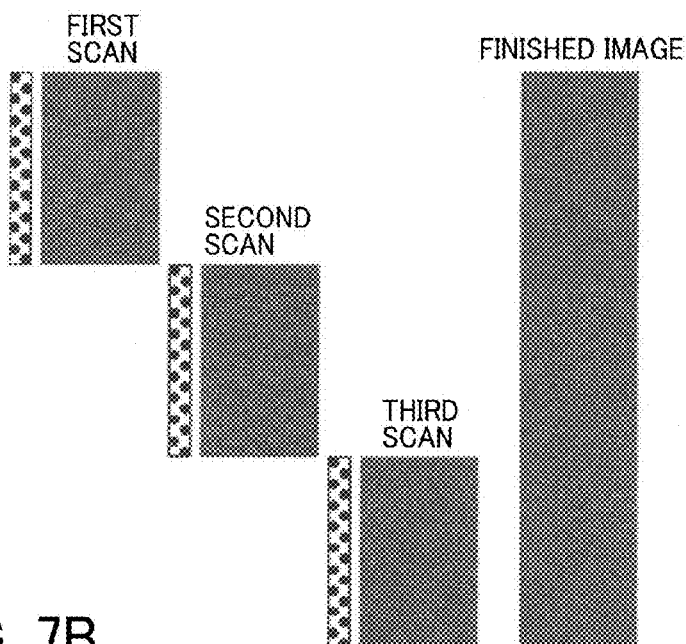
FIGS. 7A and 7B are diagrams illustrating density unevenness.
Figure 7B:
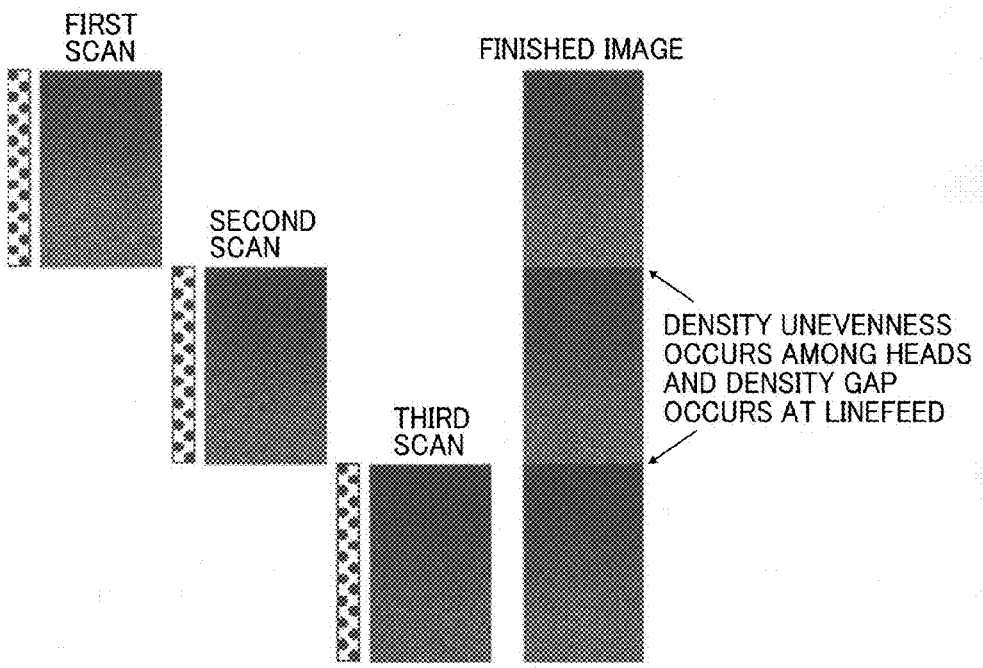

Next, density unevenness to be solved in this embodiment will be described below. In printing with the image forming apparatus described above, if characteristic in the recording head is even, an even image without density unevenness can be formed as shown in FIG. 7A. However, if characteristic in the recording head is uneven, density unevenness within the width of the recording head is noticeable as shown in FIG. 7B.

Also, if change of density within a single scan is allowable, a gap between change of density at the border of next scanning occurs, and that results in a defective image. Also, in case of forming an image by multi-scanning to enhance resolution and ejecting stability, change of density can be emphasized if the recording head with the density unevenness scans the same part for multiple times.

There are various reasons to generate the density unevenness of the recording head. For example, if size and landing position of dots are even, density unevenness does not occur as shown in FIG. 8A(1). However, if size, shape, and landing position etc. of dots are changed due to manufacturing variability for each nozzle, unevenness of ink covering the paper occurs as shown in FIGS. 8A(2) and (3), and that results in density unevenness.

Also, "satellites" are one of problems specific to inkjet printers. A "satellite" is a problem that an unintended dot is formed other than intended dot due to trailing of a droplet during flight at the time of ejecting the droplet. It is difficult to keep satellites from occurring, and it is usually difficult to control landing position. Therefore, density unevenness occurs as shown in FIG. 8A(4) due to the presence or absence of satellites and the variation in the landing position.

Figure 8B:
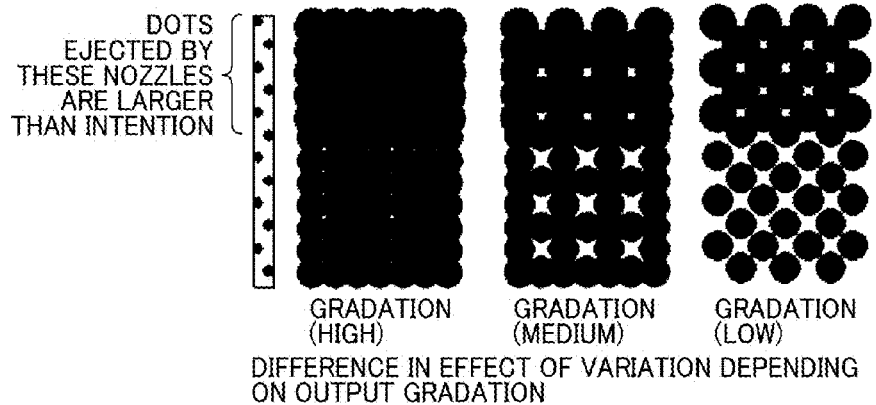

For example, if there is a nozzle that ejects a larger dot than intended, amount of ink covering around solid black area on the paper looks almost the same as shown in FIG. 8B since the surface of the paper is almost covered around the solid black area. However, in halftone area with less amount of shaping dots, density unevenness can become noticeable since size of dots tends to link to amount of covering of ink on the paper.

Figure 8C:
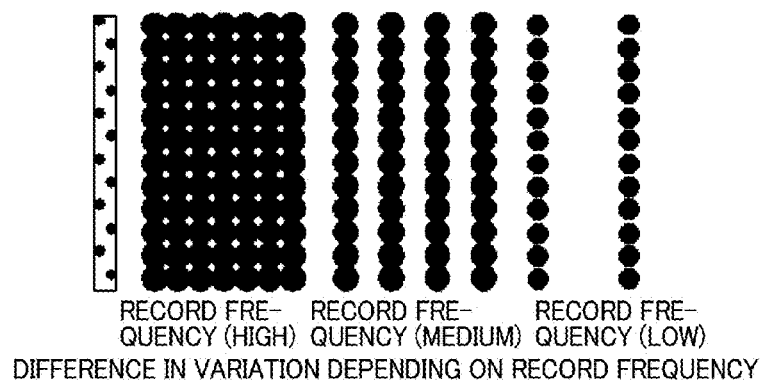

Also, the variation can differ due to content of ejected dot. For example, recording frequency can be a problem. Since the inkjet printer ejects ink by putting pressure on the recording head liquid chamber, vibration on surface of droplets ink supplying speed to the liquid chamber can differ due to ejecting frequency of droplets even if the same size of droplets are ejected, and that results in difference of ejecting characteristic of dots depending on ejecting frequency. Therefore, even if the same dots are formed on data, dots that land on the actual paper vary in case of high record density and low record density as shown in FIG. 8C.

Figure 8D:
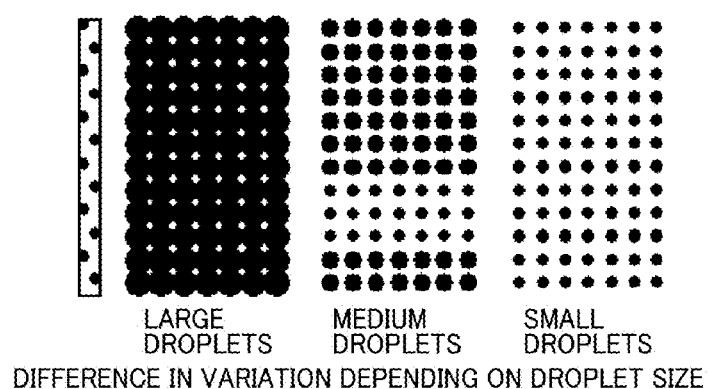

Also, in case of handling multiple kinds of multivalic droplets such as large, medium, and small droplets, the way of vibrating liquid surface of nozzle varies depending on droplet kinds, and that results in different variation depending on droplet kinds. In some cases, specific droplets vary. FIG. 8D is a diagram illustrating a case that characteristic of medium droplet is partially different.

Therefore, density of gradation output by each nozzle needs to be corrected as well as nozzles themselves, and it is preferable to correct input/output characteristic such as gamma correction. However, in case of correcting in fine units for each nozzle conventionally, an enormous number of parameters, such as "number of nozzles×number of gradations×number of record heads", is needed. Also, in some cases, density unevenness can look different due to printing mode and environmental change, and an even greater number of parameters is needed in case of correcting it. If the image forming apparatus includes a measuring device and corrects in real time using the measuring device, number of images output for measurement, number of measuring points, number of created parameters, and correcting steps become enormous. Therefore, it is more realistic to correct in units of larger area rather than in fine units of each nozzle.

Figure 9A:
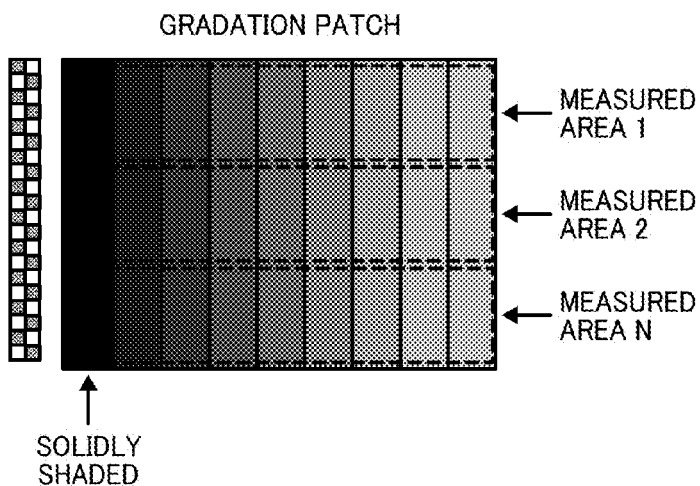
FIG. 9A is a diagram illustrating output of gradation patch for measuring ejecting characteristic.
Figure 9B:
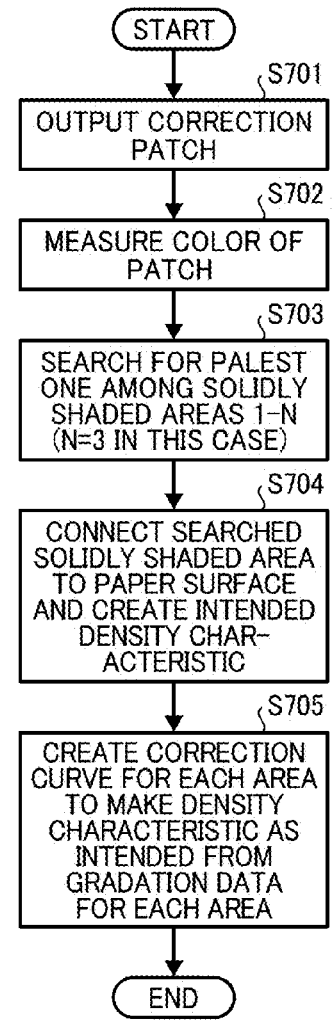
FIG. 9B is a flowchart illustrating a process of generating correction parameters.

FIGS. 9A and 9B illustrate how to generate correction parameters. FIG. 9A is a diagram illustrating output of gradation patch for measuring ejecting characteristic, and FIG. 9B is a flowchart illustrating a process of generating correction parameters.

In correcting ejecting characteristic in initial setting, after printing gradation patch at multiple measuring points (S701), image information of gradation patch is measured automatically or manually using sensor, scanner, or colorimeter (S702). Brightness, density, chromaticness, and luminance etc. are used as image information, and input/output characteristic is corrected to make the image information flat within the recording head. Here, density is taken as an example.

After searching for area with least density of solid black from the measured image information (S703), the searched solid black area is set as target value. Subsequently, gradation characteristic is created by connecting the target value of solid black with paper surface (density on paper surface) (S704). The correction needs to be performed in accordance with areas with low image density, since density is adjusted by increasing/decreasing dots in correcting gradation, and it is impossible to enhance density in solid black area where dots cannot be increased furthermore.

For example, if the aim of gradation characteristic of a product is linear density, characteristic that connects paper surface with the target value of solid black by linear density can be set as the correction target value. Here, that depends on gradation characteristic that a product is designed to achieve, so how to determine it can be configured appropriately. In this example, characteristic that connects solid black with paper surface using linear density is target value.

Figure 10A:
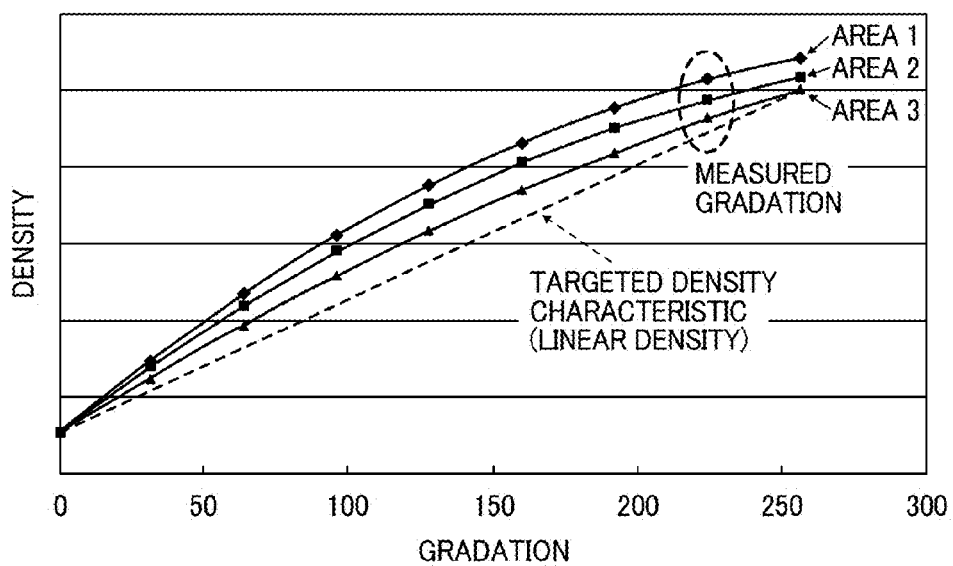
FIGS. 10A and 10B are diagrams illustrating how to generate target density characteristics and correction curves as an embodiment of the present invention.

As shown in FIG. 10A, the target density characteristic is created by determining measuring area 3 with the palest solid black density among measuring areas 1, 2, and 3 as the highest density point. Also, regarding target value of solid black, other areas are adjusted to area with low density basically. Therefore, if the target value of solid black does not satisfy predefined value, the correcting process described above can be performed after density of solid black satisfies the standard by raising voltage applied to the recording head etc. After creating the targeted density characteristic, an input/output correction curve is generated to make output value the target characteristic based on measured data at each measurement area (S705).

That is, first, color is measured after printing the gradation patch, and the result is stored. For example, density value parameter that corresponds to gradation value for each area N is stored. The gradation characteristic F_N(x) is different for each area N. Subsequently, the smallest density (output density) area of solid black (input gradation value x is maximum) is specified (N=3 in FIG. 9A) among stored gradation characteristic, and target density characteristic for whole head K(x) that joins output density value F_3(255) corresponding to maximum gradation value (x=255) in N=3 with output density value F_3(0) corresponding to input gradation value 0 (x=0) is set.

Figure 10B:
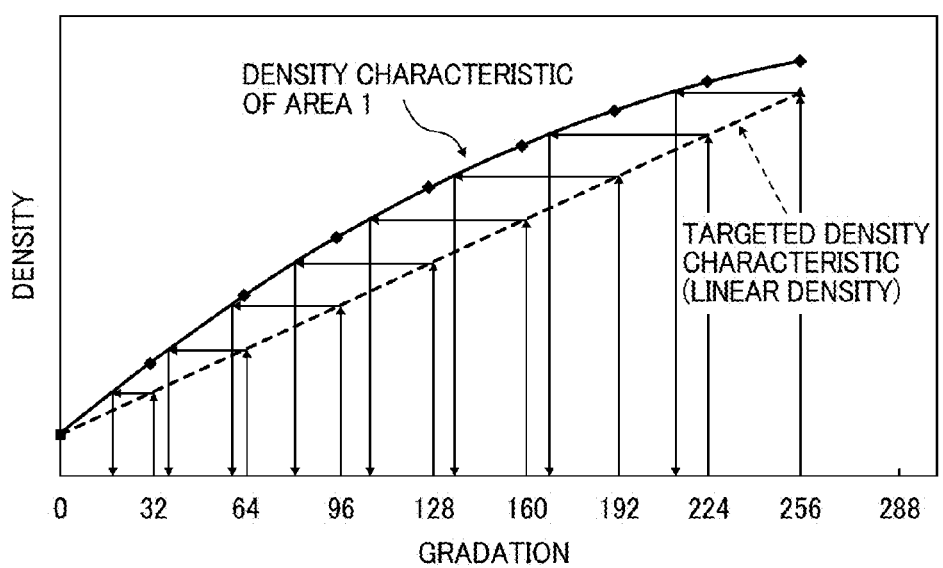

FIG. 10B is a diagram illustrating a process of generating a correction curve taking area 1 as an example. For example, since gradation 256 in area 1 is darker compared to target density characteristic, it is converted to gradation 211 in generating correction curve. Gradation 211 in area 1 is the same density as gradation 256 in area 3, and that can reduce density difference within the recording head. Likewise, gradation 224 is converted to gradation 168, gradation 192 is converted to gradation 135, gradation 160 is converted to gradation 106, and gradation 32 is converted to gradation 18.

Figures 11A, 11B:
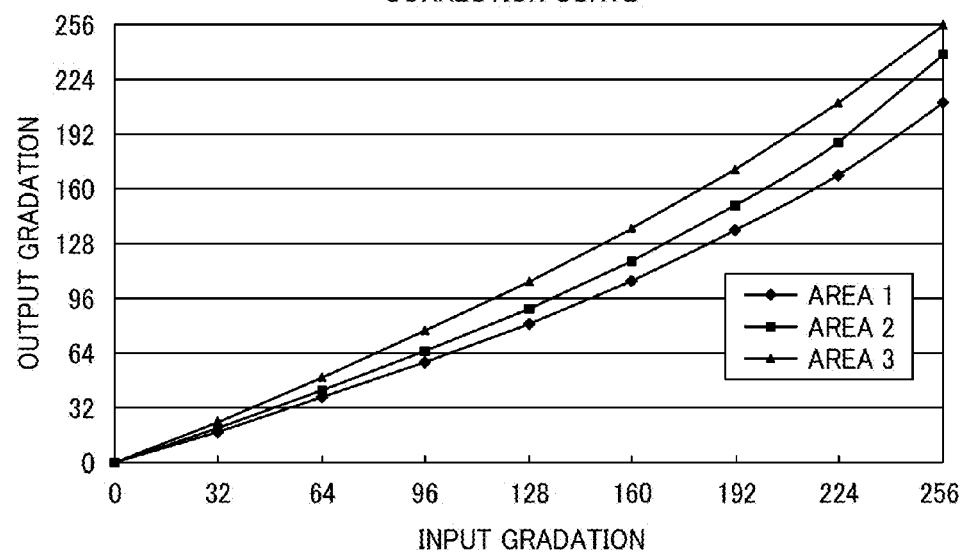
FIGS. 11A and 11B are diagrams illustrating how to generate correction curves as an embodiment of the present invention.

FIG. 11B is a diagram illustrating correction curves for areas 1, 2, and 3. FIG. 11A is a diagram illustrating gradation converting values in areas 1, 2, and 3. Gradation converting values for area 2 and 3 are also calculated using the process described above. For example, assuming gradation 256 is input, gradation 211 is output in area 1, gradation 238 is output in area 2, and gradation 256 is output in area 3, and that can reduce density difference in the recording head as shown in FIG. 10A.

Regarding points to measure gradation, in the 256-step gradation, while it is possible to measure at all of 256 points and perform correction, it is also possible to reduce number of measuring gradation steps, generate gradation characteristic with approximated curve such as a spline curve, and perform correction based on the generated gradation characteristic. It is preferable to increase/decrease the number of gradation steps appropriately in accordance with dynamic range of an image output by the product and variation of printing, since reverse correction is performed if reversal gradation occurs in the image patch due to variation of printing. Also, it is preferable to perform maintenance operation before performing the correction process and generate correction parameters after printing a nozzle check chart to check whether or not there is any ejection failure.

It is possible to generate the correction parameters described above at the time of shipment of the product. Alternatively, after equipping the image forming apparatus with devices such as a sensor, scanner, and colorimeter, it is possible to measure the image forming apparatus and generate the correction parameters. In the latter case, since time and energy taken to generate the correction parameters is important to generate the measurement parameters at the installation location of the product, it is preferable to reduce measuring gradation steps, generate gradation characteristic using an approximated curve, and perform correction to reduce processing.

Also, since characteristic change of the recording head described above can differ for each of recording head in some cases, it is preferable to perform the correction described above for each of the recording head. Furthermore, it is possible to store the correction parameters corresponding to the recording head and print mode and to print applying the corresponding correction parameters in accordance with print setting in the ROM to apply the correction parameters and the correction for each mode, because correction curve for input/output needs to be changed since the way of landing dots varies depending on printing mode even if the same recording head is used, and correction curve can be changed depending on printing mode.

As described above, correction by controlling input/output gradation basically adjusts characteristic with high density to characteristic with low density except for halftone images. That is, dots are thinned out in the area where large dots are landed, and image information tends to drop out there. Especially, it is difficult to recognize density unevenness for a character and a thin line, and image details such as dot deficit and low density and visibility have much effect on image quality. Therefore, it is possible to reduce density unevenness while maintaining the quality of a character and a thin line by having a function to perform correction selectively depending on an image object, not performing correction on characters and thin line objects or performing correction on density of solid black.

Next, correction performed on the image forming apparatus that combines multiple recording heads will be described below. Some image forming apparatuses achieve high printing speed by jointing multiple recording heads.

Figure 12A:
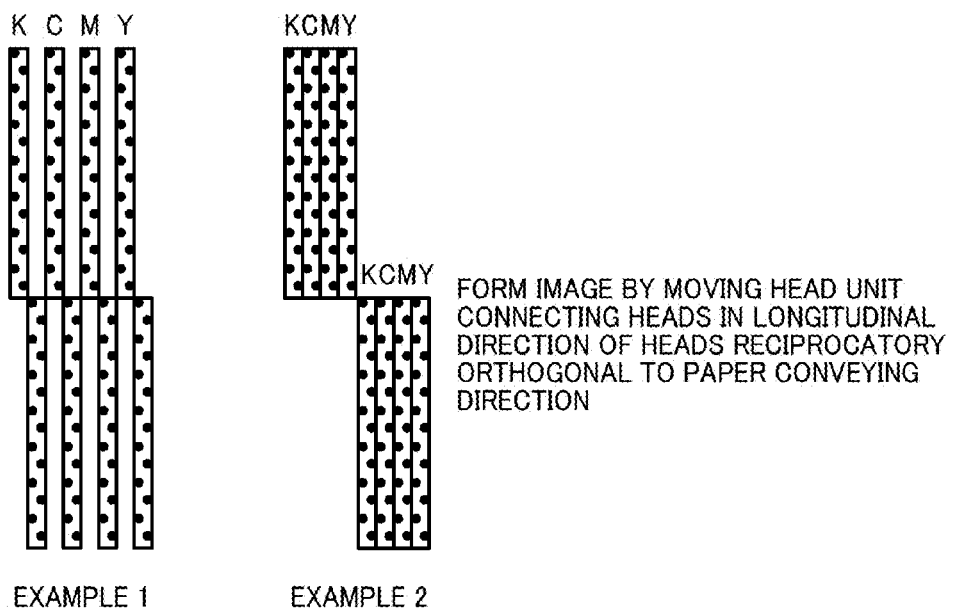
FIGS. 12A and 12B are diagrams illustrating a recording head comprised by jointing recording heads in sub-scanning direction as an embodiment of the present invention.

FIG. 12A is a diagram illustrating the image forming apparatus that includes the recording head comprised of multiple recording heads combined in the longitudinal direction and moves the recording head back and forth in the direction perpendicular to the paper feeding direction. While its basic configuration is similar to the image forming apparatus that includes four recording heads described above, density difference not only within the recording head but also among combined recording heads can be a problem since the recording heads are lined up in the longitudinal direction. In this case, if internal characteristic of each recording head is uniform, each recording head can be corrected in units of a recording head. If there is a density difference inside of the recording head, characteristics between the recording heads are matched after correcting internal characteristics of each recording head uniformly using the correcting process described above since density gap shown in FIG. 7B can occur even in a single scan due to density difference inside the recording head. In this case, since density cannot be any darker in a solid black area in gradation correcting as described above, correction curve can be formed by setting the palest part among multiple recording heads to be corrected as the target value of solid black.

Also, if target value of solid black does not exceed predefined value, it is possible to perform gradation correcting after adjusting density of solid black to exceed the norm by correcting voltage.

Figure 12B:
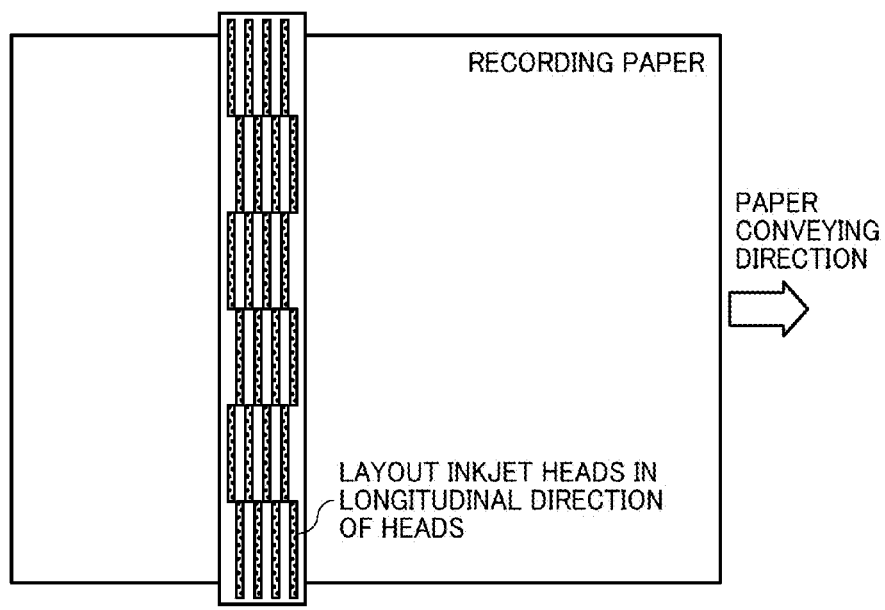

Also, as shown in FIG. 12B, a line image forming apparatus forms an image by laying out multiple recording heads lined out in the longitudinal direction of the recording head and feeding paper in the direction perpendicular to the longitudinal direction of the recording head. This kind of image forming apparatus basically forms an image in one scanning pass, and it is important to correct density unevenness since characteristic unevenness of recording heads has much effect on image quality. Also, the correction needs to be performed with a simpler configuration since the number of managed recording heads increases substantially from several to several dozen compared to the serial image forming apparatus. The correcting process in this embodiment is suitable for the line image forming apparatus too.

The case in which printing is performed with single recording head has been described above. Next, correction of density unevenness in case multiple recording heads are laid out in parallel will be described below.

Figure 13A:
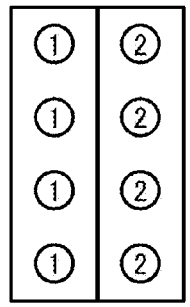
FIGS. 13A, 13B, 13C, 13D, and 13E are diagrams illustrating recording heads laid out in parallel as an embodiment of the present invention.
Figure 13B:
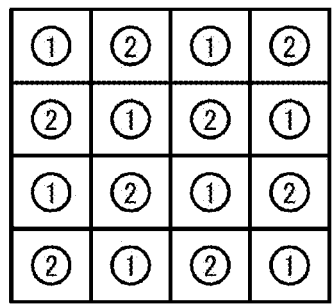
Figure 13C:
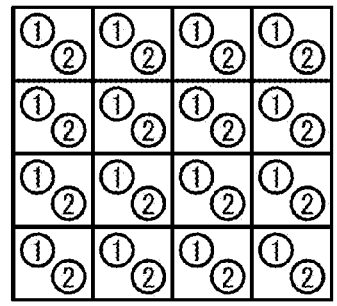
Figure 13D:
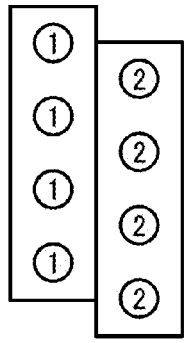
Figure 13E:
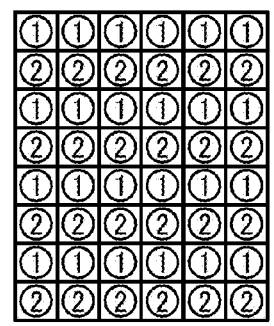

FIGS. 13A, 13B, 13C, 13D, and 13E are diagrams illustrating recording heads laid out in parallel. Examples of landing dots in case the same recording heads are laid out in parallel are shown in FIGS. 13A, 13B, and 13C. Examples of landing dots in case the recording heads are laid out staggered half a pitch of the nozzle are shown in FIGS. 13D and 13E. In the simple parallel layout shown in FIG. 13A, it is possible to gain the effect of multi-pass printing and to print complementing nozzle deficit due to ejection failure etc. Also, it is possible to fill up a pixel with small droplets since it is possible to land droplets in the same pixel, and it is possible to make density high since ink blur can be reduced. In the half pitch staggered layout shown in FIG. 13D, it is possible to gain effect of interlaced printing, and it is possible to print a high-resolution image using a low resolution head with a single scan.

Since there is density differences both among recording heads and within the recording head as described above, density unevenness can be a problem likewise. FIGS. 14A, 14B, 14C, and 14D are diagrams illustrating density characteristics of image areas in case recording heads with different density characteristics are laid out in parallel.

Figure 14A:
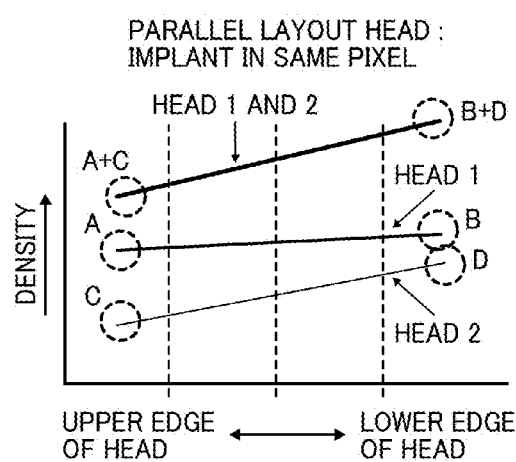
FIGS. 14A, 14B, 14C, and 14D are diagrams illustrating density characteristics of recording heads as an embodiment of the present invention.

FIG. 14A is a diagram illustrating density characteristics of recording head 1 and recording head 2 A, B, C, and D, and density characteristics in case of landing droplets in the same pixel using the record heads 1 and 2 A+C and B+D in case the recording heads are laid out in parallel as shown in FIG. 13A and the same density droplets are landed in the same pixel. There is density distribution in each recording head (density at lower edge of the recording head is higher than density at upper edge of the recording head), and there is density unevenness in the final image density. In this embodiment, the recording heads 1 and 2 are divided into four blocks for predefined number of nozzles.

Figure 14B:
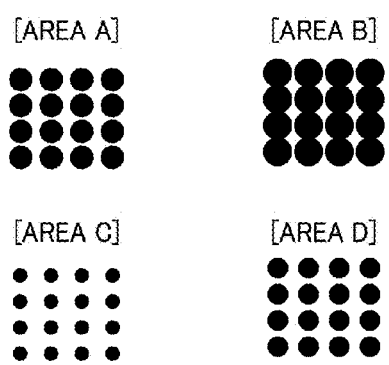

FIG. 14B is a diagram illustrating dot forming in each area A, B, C, and D on the recording medium, and solid black is printed in each area. As shown in FIG. 14B, differences in droplet sizes become differences in density. Since an image with density unevenness is formed under this condition, density unevenness needs to be corrected. The top block of four blocks into which the recording head 1 shown in FIG. 13A is divided forms area A by landing dots, and the bottom block of four blocks into which the recording head 1 shown in FIG. 13A is divided forms area B by landing dots. The top block of four blocks into which the recording head 2 shown in FIG. 13A is divided forms area C by landing dots, and the bottom block of four blocks into which the recording head 2 shown in FIG. 13A is divided forms area D by landing dots.

Figure 14C:
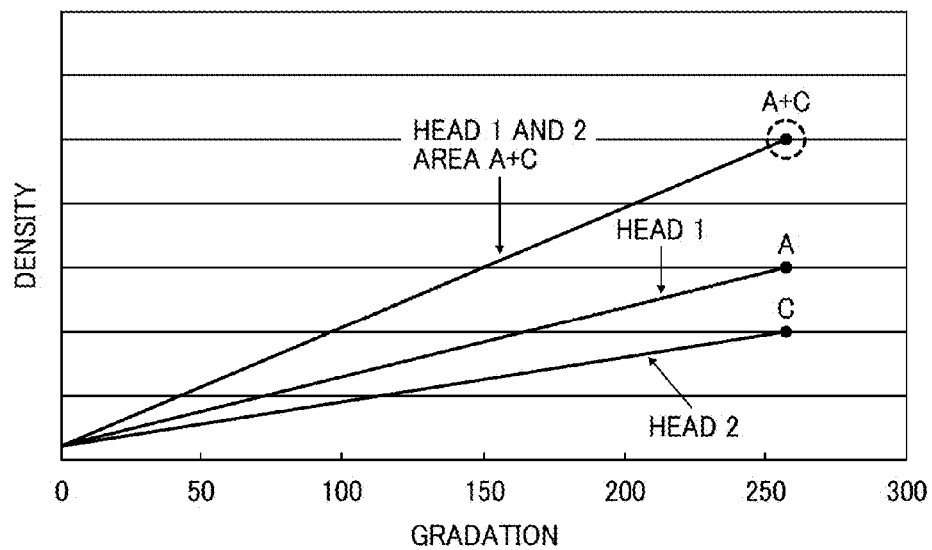
Figure 14D:
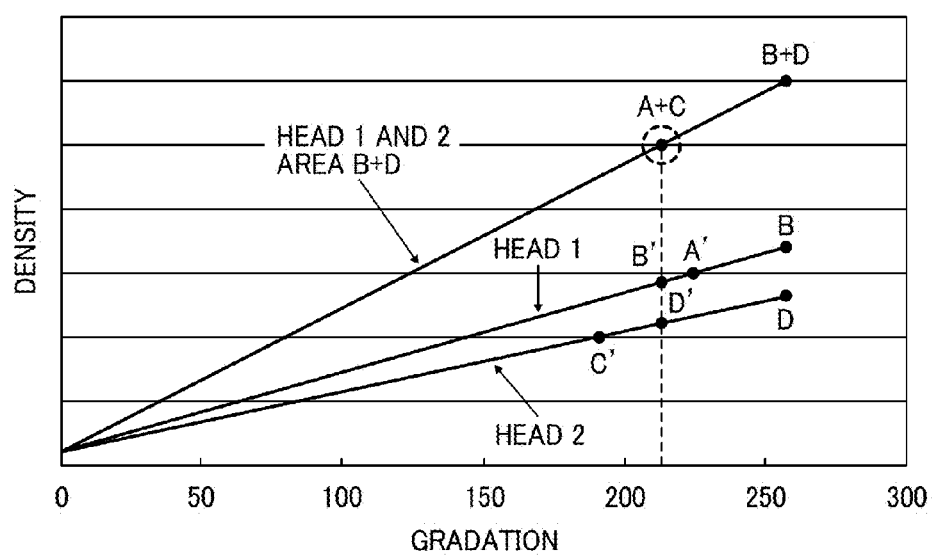

FIG. 14C is a diagram illustrating density characteristics of area A and C in case of printing in the same pixel using the parallel head, and FIG. 14D is a diagram illustrating density characteristics of area B and D in case of printing in the same pixel using the parallel head. Based on these density characteristics, correcting process of density unevenness in this embodiment will be described below with reference to FIGS. 15A, 15B, 15C, and 15D.

Figure 15A:
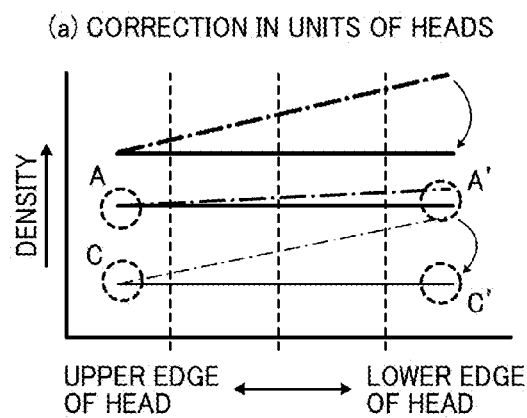
FIGS. 15A, 15B, 15C, and 15D are diagrams illustrating conventional correction of density unevenness and correction of density unevenness of the present invention.
Figure 15C:
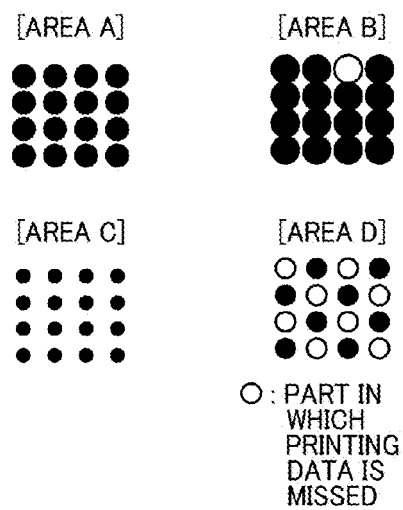
Figure 15B:
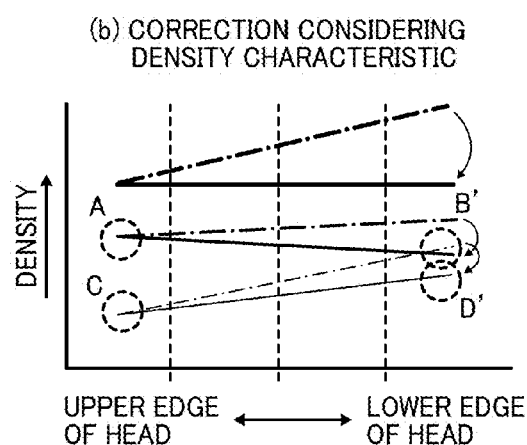
Figure 15D:
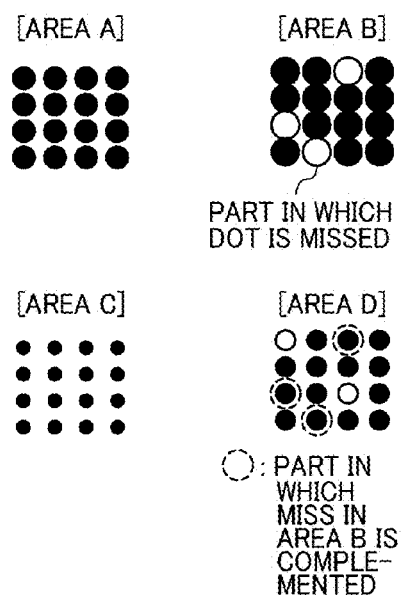

FIG. 15A is a diagram illustrating conventional correction of density unevenness, and FIG. 15B is a diagram illustrating correction of density unevenness in this embodiment considering density characteristic. In the conventional correction of density unevenness shown in FIG. 15A, in order to ensure internal density evenness in units of a recording head, area B becomes pale to reduce density difference between A and B in the recording head 1, and area D becomes pale to reduce density difference between C and D in the recording head 2. As shown in FIG. 15A, it is needed to print at a gradation value whose density is A' in area B to make the density in area B as same as area A. Likewise, it is necessary to print at a gradation value whose density is C' in area D. The density of the final image becomes flat, and it looks a good correction result. However, as shown in FIG. 15C, the number of landed droplets is decreasing to make density pale in area B and D. While droplets are landed in the same pixel in area B and D, there are pixels where no droplet is landed since there is no relationship between each recording head. Also there are dot deficits in area D since the number of landed droplets is decreased to make the density pale, and that results in lowering granularity of the image.

To cope with this issue, in this embodiment, density correction in units of the recording head is not performed. Instead, the density is corrected based on density characteristic in units of the area. It is not necessary to make the internal density characteristic flat in units of the recording head in order to make the density of the final image flat. Therefore, while inside of the recording head is made flat in the conventional correction, there is density unevenness inside of the recording head in this embodiment.

Figure 16A:
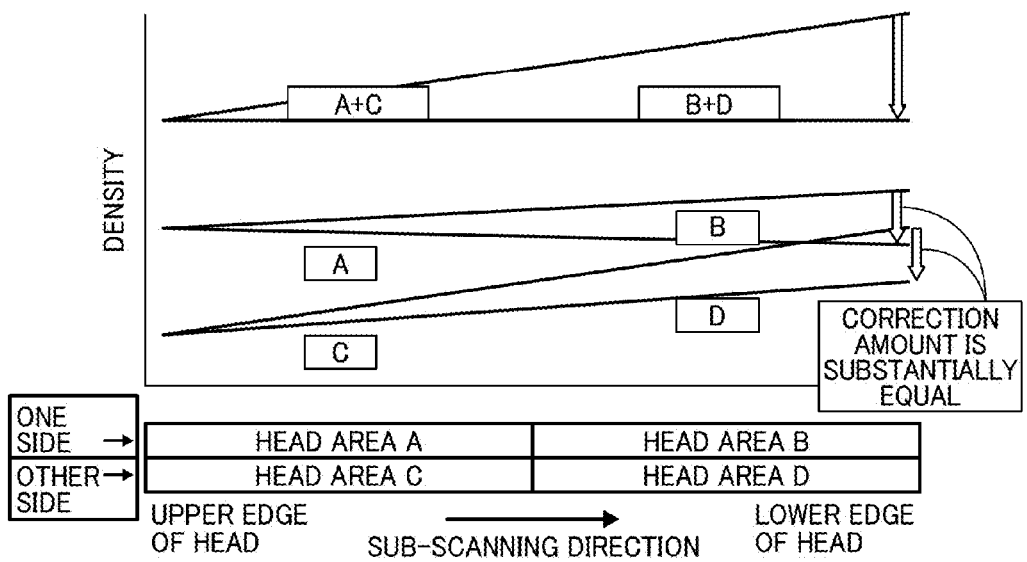
FIGS. 16A and 16B are diagrams illustrating correction of density of the present invention.
Figure 16B:
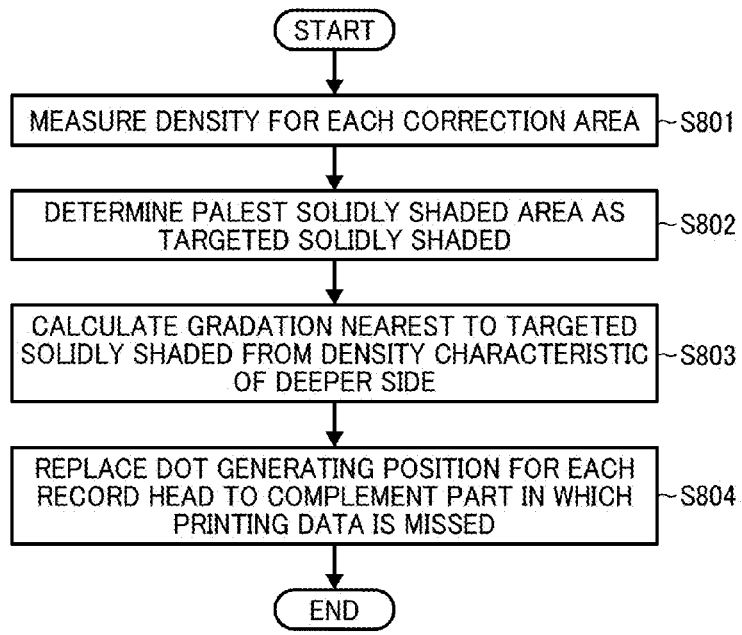

FIGS. 16A and 16B are diagrams illustrating the density correction in this embodiment. Assuming that the recording head 1 and 2 are divided into two blocks, the density characteristics of each recording head 1 and 2 (A, B, C, and D) are shown in FIG. 16A. FIG. 16B is a flowchart illustrating a process of correcting density in this embodiment. The process shown in FIG. 16B is executed by the CPU 401 (the correcting unit) in the image processing apparatus 400. Area A and C are upper blocks of the recording head 1 and 2, and area B and D are lower blocks of the recording head 1 and 2.

After measuring density in each correction area (block) by a measuring apparatus not shown in figures (S801), the palest area (block) among divided areas is set as a target gradation (S802). In this embodiment, the correction amount is determined considering the whole of two head areas in the sub-scanning direction. It is needed to make the whole head substantially flat density. In that case, the correction is not performed to reduce each of two head areas to the target density that becomes substantially flat, but the correction is performed to make the total substantially flat and absolute values of correction amount in each head area substantially equal.

The correction is performed to make gradation values adding two head areas (e.g., A+C and B+D) substantially equal (S803). Therefore, it is not necessary to make the density characteristic of one side of head rows (AB) substantially equal from the top of the head to the bottom of the head (between A and B). For example, assuming that head area A=70, head area B=100, head area C=40, and head area D=90, in case of the target value is A+C=110, the correction is performed to make B→B'=A and D→D'=C by making flat uniformly in the conventional correction. In this case, each correction amount becomes ΔB=50 and ΔD=30. The difference between two correction amounts (20) results in a large change in the difference in ejecting characteristics for each recording head, and that results in deteriorating image quality as shown in FIGS. 8A, 8B, 8C, and 8D, i.e., decreasing of image granularity occurs.

In this embodiment, in correcting head area B and D to become A+C=110 (target value), the correction amount are made substantially equal. That is, the correction is performed at correction amount to make ΔB and ΔD equal. Therefore, the correction amount becomes ΔB=ΔD=40.

Since dot deficits increase as gradation becomes low due to decreasing of printing ratio, it is possible to decrease the number of dot deficits by increasing the gradation value. Since it is possible to land dots in the same pixel in the configuration of this embodiment, print data in area D is generated to complement dot deficits in area B (generated by correcting B to B') (S804'). Consequently, it is possible to decrease dot deficits and improve image quality.

Figure 17A:
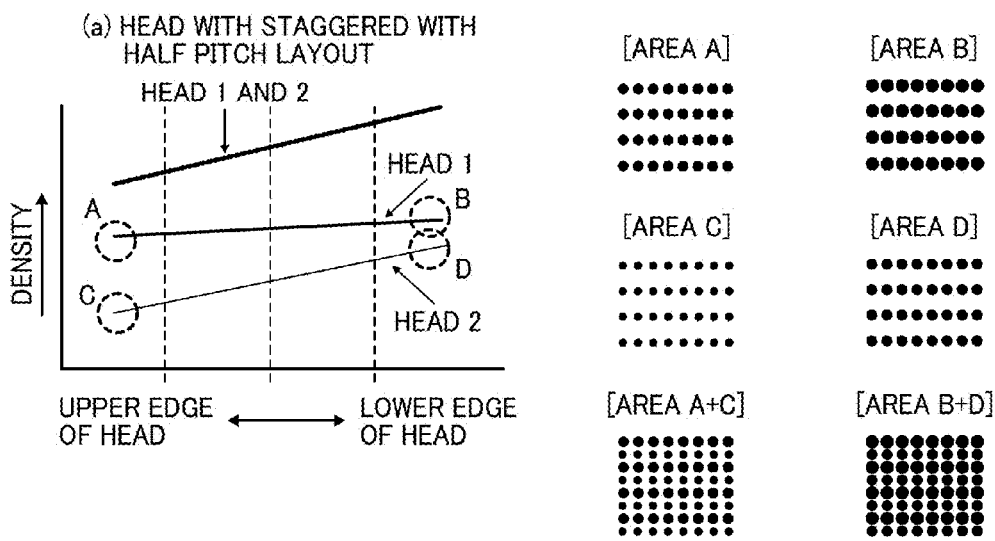
FIGS. 17A, 17B, and 17C are diagrams illustrating correction of density of the present invention in laying out heads shifted half a pitch as an embodiment of the present invention.
Figure 17B:
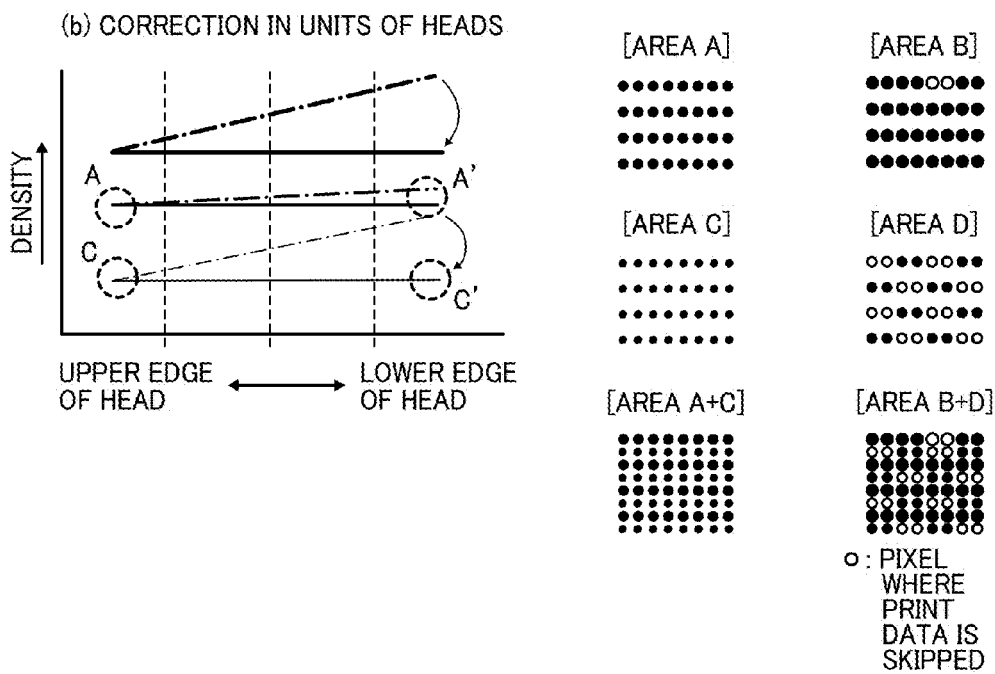
Figure 17C:
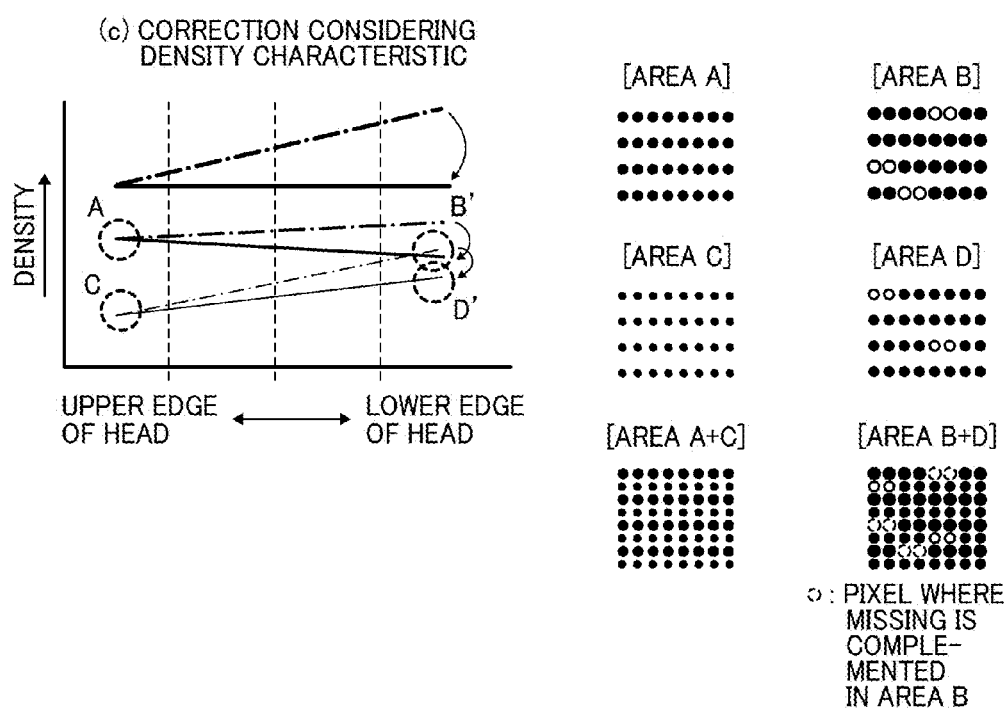

FIGS. 17A, 17B, and 17C are diagrams illustrating a head with layout staggered half a pitch. FIG. 17A is a diagram illustrating density characteristics of the recording heads 1 and 2 and density characteristics landed by the recording head 1 and 2. As shown in figures, since there is difference of density characteristic between area A+C and area B+D, it is needed to perform density correction just like as the case of parallel layout.

In FIG. 17B, dot deficits in area B+D are noticeable due to decreasing of the number of landed dots in order to make density characteristic in units of the head flat, and that results in lowering granularity of image.

To cope with this issue, just as in the case of the parallel layout described above, the correction is performed based on density characteristic in units of the area instead of correcting density in units of the recording head. Consequently, dot deficits in area B+D become less noticeable, and that results in keeping granularity of image from lowering. In this embodiment, since dots are layout adjacently in the nozzle row direction by using different recording heads, print data in area D is generated to complement dot deficits in area B so that dot deficits appear sequentially. Consequently, dot deficits become less noticeable, and that results in improving image quality. As described above, it is possible to improve density unevenness of image and image uniformity and to keep granularity from deteriorating.

The present invention can be implemented by supplying a storage medium that stores a software program code that implements functions described above to a system or an apparatus and executing the program code stored in the storage medium by a computer (CPU or MPU) in the system or the apparatus after reading the program code from the storage medium. In this case, the program code read from the storage medium itself implements the functions described above. For example, a hard disk drive, an optical disk, a magneto-optical disk, a nonvolatile memory card, and the ROM can be used as the storage medium to supply the program code. Also, not only the functions described above are implemented by executing the read program code by the computer, but also the functions described above are implemented by executing a part of the actual process or all of the actual process by an Operating System (OS) running on the computer based on a command from the program code. Furthermore, after writing the program code read from the storage medium to a memory in an expansion board inserted in the computer or a memory in an expansion unit connected to the computer, the functions described above can be implemented by executing a part of the actual process or all of the actual process by the CPU in the expansion board or the expansion unit. Also, the program that implements functions described above can be provided from a server through communication via a network.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

What is claimed is:

1. An image forming apparatus that includes parallel recording heads divided into multiple blocks per predefined number of nozzles to eject droplets in different sizes, and forms an image by ejecting the droplets from the recording head on a recording medium,
the image forming apparatus comprising:
a measurement unit to measure image density on the recording medium per in units of a divided block; and
a correction unit to correct density characteristic of each recording head comprising a block whose density is the highest.

2. The image forming apparatus according to claim 1, wherein the correction unit corrects density of the block whose density is the highest to density of the block whose density is the lowest and equalizes correction amount per recording head of each recording head comprising the block whose density is the highest.

3. The image forming apparatus according to claim 1, further comprising a complementing unit to complement print data for each recording head,
   wherein the complementing unit generates print data for one recording head to complement a dot deficit generated in accordance with a correction amount for another recording head.

4. The image forming apparatus according to claim 1, wherein the recording heads are laid out in parallel so that nozzle rows are laid out to locate at the same position orthogonal to the direction of the nozzle row.

5. The image projecting apparatus according to claim 1, wherein the recording heads are laid out in parallel staggered half a pitch in the direction of the nozzle row.

6. A method of forming an image by laying out multiple recording heads that include multiple nozzles that eject a droplet in different sizes in parallel and ejecting a droplet from the recording head on a recording medium, comprising the steps of:
   measuring image density on the recording medium per in units of a divided block wherein the recording heads are divided into multiple blocks per predefined number of nozzles; and
   correcting density characteristic of each recording head that comprises a block whose density is the highest.

7. A non-transitory recording medium storing a program that, when executed by a computer, causes the computer to implement a method of forming an image by laying out multiple recording heads that include multiple nozzles that eject a droplet in different sizes in parallel and ejecting a droplet from the recording head on a recording medium,
   the method comprising the steps of:
   measuring image density on the recording medium per in units of a divided block wherein the recording heads are divided into multiple blocks per predefined number of nozzles; and
   correcting density characteristic of each recording head that comprises a block whose density is the highest.

\* \* \* \* \*